US005719484A

United States Patent [19]

Taniguchi et al.

[11] Patent Number: 5,719,484

[45] Date of Patent: Feb. 17, 1998

[54] VEHICLE POWER GENERATING SYSTEM AND METHOD FOR CONTROLLING THE SAME

[75] Inventors: Makoto Taniguchi, Oobu; Atsushi Umeda, Anjo; Hirohide Sato, Toyokawa; Shin Kusase, Oobu, all of Japan

[73] Assignee: Nippondenso Co., Ltd., Kariya, Japan

[21] Appl. No.: 637,080

[22] Filed: Apr. 24, 1996

[30] Foreign Application Priority Data

Apr. 24, 1995 [JP] Japan .................................... 7-098992

[51] Int. Cl.[6] .................................................... H02P 9/00

[52] U.S. Cl. ............................................. 322/20; 322/28

[58] Field of Search ................................ 322/18, 20, 25, 322/28, 29

[56] References Cited

U.S. PATENT DOCUMENTS

| | | | |
|---|---|---|---|
| 4,701,692 | 10/1987 | Takeuchi et al. | 322/90 |
| 4,985,670 | 1/1991 | Kaneyuki et al. | 322/28 |
| 5,059,886 | 10/1991 | Nishimura et al. | 322/28 |
| 5,177,677 | 1/1993 | Nakata et al. | 363/89 |
| 5,418,401 | 5/1995 | Kaneyuki | 307/10.1 |
| 5,543,703 | 8/1996 | Kusase et al. | 322/16 |
| 5,550,457 | 8/1996 | Kusase et al. | 322/29 |

FOREIGN PATENT DOCUMENTS 6-62592 2/1994 European Pat. Off. .

*Primary Examiner*—Steven L. Stephan
*Assistant Examiner*—Nicholas Ponomarenko
*Attorney, Agent, or Firm*—Cushman, Darby & Cushman IP Group of Pillsbury, Madison & Sutro LLP

[57] ABSTRACT

A power-generating voltage outputted from a vehicle synchronous power generator is adjusted to a first voltage for charging a battery under the control of a field current. Further, a leading phase current that leads a phase voltage is supplied to each of multiple armature windings and the field current is supplied to the field winding, whereby the power-generating voltage can be adjusted to a second voltage higher than the first power-generating voltage. Owing to the above construction, a voltage higher than the normal voltage can be generated by supplying each leading phase current from the vehicle synchronous power generator; hence power can be supplied to a high-voltage load based on the generated high voltage.

20 Claims, 17 Drawing Sheets

VEHICLE POWER GENERATING SYSTEM AND METHOD FOR CONTROLLING THE SAME

CROSS-REFERENCE TO RELATED APPLICATION

The present application is related to and claims priority from Japanese Patent Application No. Hei. 7-98992, incorporated herein by reference.

BACKGROUND OF THE INVENTION

1. Field of the Invention

The present invention relates to a vehicle power generating system using a synchronous power generator, and more specifically to a vehicle power generating system for supplying a leading phase current to each armature winding of a synchronous power generator and to a method of controlling the vehicle power generating system.

2. Description of Related Art

A three-phase synchronous power generator (e.g., an alternator) having a device for producing field magnetic flux, e.g., a field coil attached to a rotor, is normally used as a vehicle power generator. A power-generating voltage outputted from the three-phase synchronous power generator is rectified by a built-in three-phase full-wave rectifier so that a 12 V-rated battery is charged.

Japanese Patent Laid-Open No. Hei 5-122863 proposes a power-generating voltage switching-type vehicle power generating system having a high-voltage load driven by a high voltage and a low-voltage load corresponding to a normal load driven by a low voltage, where a power-generating voltage is switched to the high voltage and reduced to the low voltage by a step-down unit when the high-voltage load is driven, thereby driving the low-voltage load under the reduced voltage.

With a view toward saving space in an automobile engine compartment and packing it densely, there has recently been a demand for a further size and weight reduction of the alternator even though the operating temperature of the AC power generator tends to rise with a corresponding reduction in size and weight.

Potentially, such a size and weight reduction may reduce an output generated at low-rpm, decrease the amount of magnetic flux and the number of turns of each armature winding and increase in various losses—for example, when an electrical load increases at idle, the power to be generated is insufficient.

In the aforementioned vehicle power generating system on the other hand, a field current is normally reduced when the low voltage is generated. This is because the power generator is operated in low magnetic-flux and low output states when the normal load that makes up the most of the state of operation of the power generator is driven (i.e., the low-voltage load is driven). A difficulty arises in that since a magnetic circuit and the number of turns of a field winding must be designed in accordance with the time of generation of a high voltage, the power generator cannot be reduced in size and weight.

SUMMARY OF THE INVENTION

With the foregoing problems in view, it is therefore an object of the present invention to provide a vehicle power generating system capable of generating a sufficient output even in a low-rpm region while suppressing an increase in the size and weight of a power generator.

It is another object of the present invention to provide a method of controlling such a vehicle power generating system.

It is still another object of the present invention to provide a power-generating voltage switching-type vehicle power generating system capable of being reduced in size and weight and a method of controlling such a vehicle power generating system.

The above objects are achieved according to a first aspect of the present invention by providing a power generating system including a vehicle synchronous power generator, an AC-DC power converter, and a controller for adjusting a power-generating voltage outputted from the synchronous power generator to a first voltage for charging a battery and a predetermined second voltage different from the first voltage, where the controller supplies a leading phase current preceding a phase voltage to each armature winding when the controller adjusts the power-generating voltage to at least the second voltage.

In this way, the power-generating voltage of the vehicle synchronous power generator is adjusted to the first voltage for charging the battery or the second voltage different from the first voltage. Further, when the power-generating voltage is adjusted to at least the second voltage, the leading phase current that leads the phase voltage is supplied to the corresponding armature winding.

In the supply of the leading phase current to the corresponding armature winding, the leading phase current flows from the high-potential DC power output terminal side to the armature winding for a predetermined period when the power-generating voltage outputted from the corresponding armature winding exceeds the voltage at the high-potential DC power output terminal of the AC-DC power converter, and the power-generating voltage is reduced from the state in which the power-generating current flows out into the AC-DC power converter and falls below the voltage at the high-potential DC power output terminal. Further, when the power-generating voltage produced from the armature winding falls below the voltage at the low-potential DC power terminal of the AC-DC power converter and the power-generating voltage rises from the state in which the power-generating current flows from the low-potential DC power terminal to the armature winding and exceeds the voltage at the low-potential DC power terminal, the leading phase current flows out from the armature winding to the low-potential DC power terminal to the contrary for a predetermined period.

Since such a leading phase current precedes the phase voltage (i.e., the power-generating voltage produced from the armature winding) to increase the field magnetic flux, the power-generating voltage is raised so that the generated output is increased.

Namely, since the generated output is increased by the supply of leading-phase current components to the corresponding armature winding, the following operations and effects can be brought about as compared with the case where the power-generating voltage is switched by the conventional field current alone.

When the power-generating voltage is switched to the first or second voltage by adjusting the field current as in the prior art, it is necessary to design the field winding to the number of ampere-turns capable of generating the second voltage even in a low-rpm region. A disadvantage arises that the field system is increased in size and the body structure of the system becomes large. Further, the field current must be reduced in a high-rpm region in which much operation time is required, thereby resulting in much waste. Thus, the output at the time of the generation of the second voltage can be easily improved without increasing the body structure of the system by using this invention.

If the leading phase current is supplied even upon generation of the first voltage, then an improvement in output can be obtained in a low-rpm region in particular, and hence the system can provide a high output or can be reduced in size and weight.

Preferably, the generator includes a rotor having a field winding, and the controller adjusts the amount of field current supplied to the field winding and the leading phase current to control the power-generating voltage.

Additionally, the second voltage may be higher than the first voltage. Since the second voltage is higher than the first voltage, the effect of increasing the power-generating output (i.e., the power-generating voltage) by the supply of the leading phase current can be used upon generation of the second voltage. Since the effect of increasing the power-generating output by the supply of the leading phase current can be utilized upon generation of the high voltage, the number of ampere-turns of the field winding can be reduced correspondingly in comparison with a conventional device producing the same output, thereby making it possible to achieve a size and weight reduction of the power generator. Of course, the leading phase current can be supplied upon generation of the first voltage in a range in which the amount of current is smaller than that at the time of generation of the second voltage and the field current can be increased upon generation of the second voltage as compared with the time when the first voltage is generated.

More preferably, the second voltage may be 1.2 to 5 times higher than the first voltage. Since the second voltage is set to 1.2 to 5 times the first voltage, the output can be effectively increased in a rpm region in which the frequency of use is kept high.

It is also possible to provide a step-down unit reducing the power-generating voltage corresponding to the second voltage to the first voltage to charge the battery. In this way, power can be applied to the first-voltage operating load upon generation of the second voltage. Preferably, the step-down unit is a DC-DC converter to simplify the system structure.

The vehicle synchronous power generator may be electrically connected to a high-voltage load driven by the second voltage through a switch, where the controller adjusts the power-generating voltage to the second voltage when the switch is turned on. Since the turning-on of the switch connected to the high-voltage load driven by the second voltage is detected to adjust the power-generating voltage to the second voltage, control can be simplified.

Additionally, the controller may supply an initial field current from the battery to the field winding and switch a high-potential terminal of the field winding from the battery to an output terminal of the power generator after the power-generating voltage has been established. Since the field current is first supplied from the battery and the current is supplied from the high-potential DC power terminal of the AC-DC power convertor after the establishment of the power-generating voltage, the field current is increased with an increase in the power-generating voltage so that field magnetic flux in the power-generating voltage established state or in the normal region can be increased. This allows a reduction in the number of turns of the field winding necessary to form field magnetic flux required in the normal region. At this time, the early establishment of the power-generating voltage can be achieved by supplying at least the leading phase current during a period up to the establishment of the power-generating voltage.

The controller also may reduce the field current when the power-generating voltage exceeds the second voltage. Since the field current is decreased when the power-generating voltage exceeds the second voltage, the power-generating voltage can be adjusted to the second voltage even when the power-generating voltage exceeds the second voltage in the case of the mere stop of the leading phase current.

The system may also include a number-of-revolutions detector for detecting the number of revolutions of the power generator so that when the number of revolutions thereof is high, the controller controls the power-generating voltage to a voltage higher than that at the time that the number of revolutions thereof is low. Since the power-generating voltage is switched at high rpm to the second voltage higher than the voltage at low-rpm, the power-generating voltage is not limited to the low voltage at low-rpm and hence the second voltage can be set high.

The controller may include an inverter circuit having a plurality of high side switches, each including a semiconductor switching device which connects a high-potential DC power terminal to an output terminal of each armature winding of the power generator and a plurality of low side switches each composed of a semiconductor switching device which connects a low-potential DC power terminal to the output terminal of each armature winding, so that it controls the semiconductor switching devices forming the high side switches and the semiconductor switching devices forming the low side switches to supply the leading phase current to the corresponding armature windings due to a delay in off timing of each semiconductor switching device. Since the leading phase current is supplied to each armature winding due to the delay in off timing of each of the semiconductor switching devices forming at least one of the high side switches and the low side switches of the inverter circuit, the system can be simply configured and the inverter circuit also doubles as the AC-DC power converter. Since the leading phase current is supplied from the short-circuiting circuit composed of the semiconductor switching devices for respectively short-circuiting the output terminals of the armature windings, a circuit configuration for supplying the leading phase current to the corresponding armature winding can be simplified.

The controller may include a short-circuiting circuit composed of semiconductor switching devices for respectively short-circuiting between the output terminals of the armature windings so that the controller allows a leading phase current to flow in each armature winding after a current flowing out from each armature winding has been brought to zero and allows the leading phase current to flow out from each armature winding after the current flowing into each armature winding has been brought to zero. After the current that flows out from the corresponding armature winding, has been brought to zero, the leading phase current is caused to flow into the armature winding. In this way, after the current that flows in the corresponding armature winding has been brought to zero, the leading phase current is caused to flow out from the armature winding, whereby the power can be supplied.

Each of the semiconductor switching devices may include a bidirectional conducting element such as a SiC MOSFET. Since the semiconductor switching device is composed of the bidirectional conducting element such as the MOSFET, the circuit can be simplified in configuration. Also, since the MOSFET is composed of SiC, the MOSFET is excellent in usability in a high-temperature environment.

The system may also include current detection resistances connected in series with the semiconductor switching devices, where the controller controls the leading phase current based on a voltage drop developed across each of the current detection resistances. Since the current detection resistances are connected in series with their corresponding semiconductor switching devices, the leading phase current can be easily detected by each current detection resistance and hence the control can be carried out with ease and reliability. Also, the current detection resistors may be formed integrally with the semiconductor switching devices. Thus, the system can be simplified in structure.

The system may also include a magnetic pole position detector for detecting a position of each of magnetic poles of the rotor attached to the synchronous power generator, where the controller determines a carrying period of the leading phase current based on the detected position of magnetic poles. Since the carrying or supplying period of the leading phase current is decided based on the detected position of magnetic pole of the rotor, the leading phase current can be controlled with accuracy.

Also, the high-voltage load may include an EHC (i.e., a catalytic heater).

According to another aspect of the present invention, the above objects are achieved by providing a method of controlling such a vehicle power generating system which includes the steps of supplying a leading phase current preceding a phase voltage to each armature winding when the power-generating voltage is adjusted to at least the second voltage, and forming field magnetic flux using both the armature windings and the rotor.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Preferred embodiments of the present invention will hereinafter be described in detail with reference to the accompanying drawings.

First Embodiment

Figure 1:
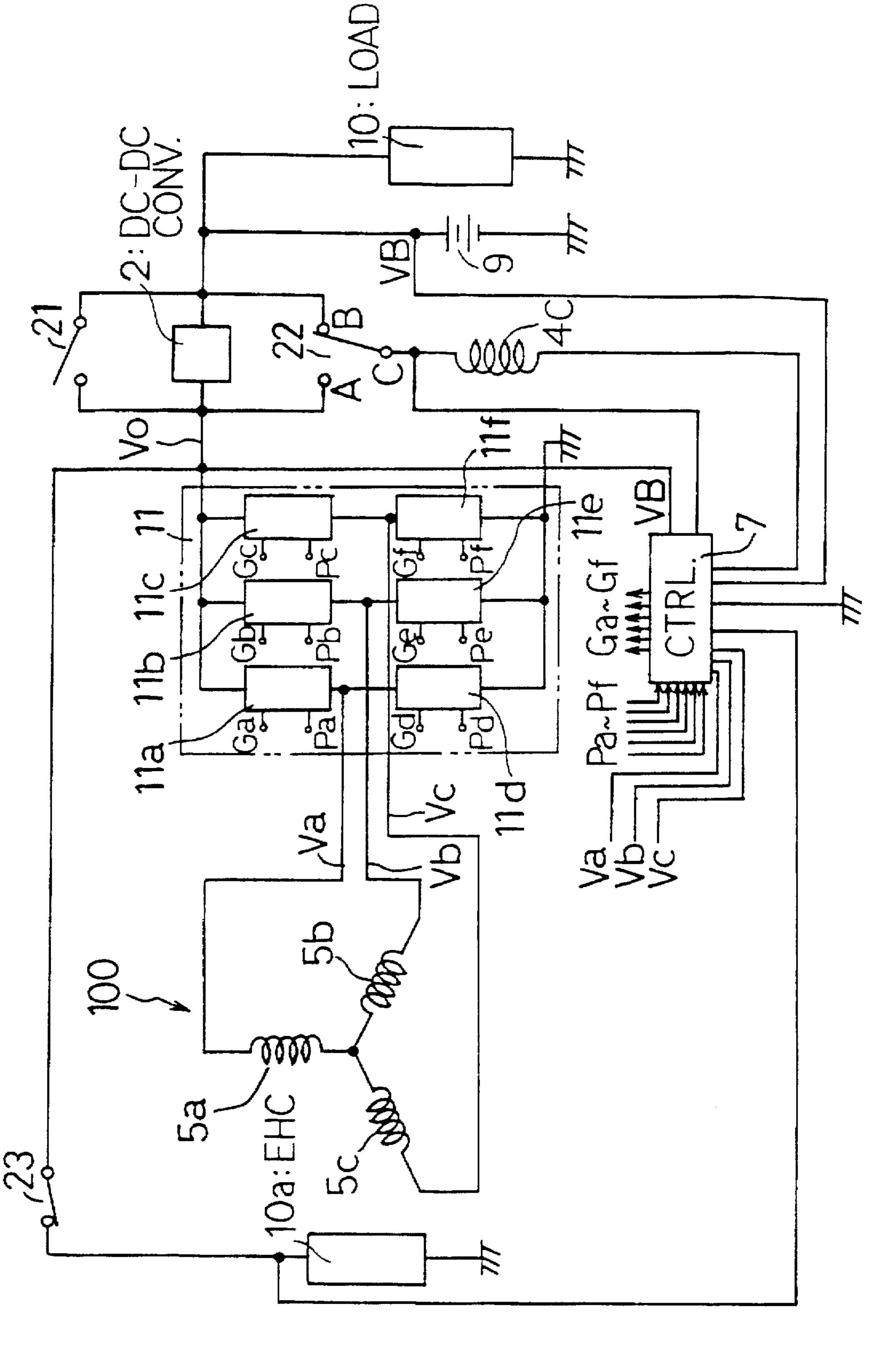
FIG. 1 is a block diagram showing a first embodiment of a vehicle power generating system according to the present invention.

A first embodiment of an automobile or vehicle power generating system according to the present invention will be described with reference to the block diagram shown in FIG. 1, where the vehicle power generating system includes a three-phase synchronous power generator 100, a three-phase full-wave rectifier 11 (corresponding to the AC-DC power converting means recited in the appended claims) for rectifying a current generated by the three-phase synchronous power generator 100, a controller 7, a DC-DC converter 2 (corresponding to the boosting and step-up means recited in the appended claims), and switches 21 through 23. The three-phase full-wave rectifier 11 and the controller 7 constitute a determining means and a leading phase current supplying means as recited in the appended claims.

A power-generating current produced by each of armature coils 5*a* through 5*c* is rectified by the three-phase full-wave rectifier 11. A field current passing through a field coil 4*c* is controlled by the controller 7. When a rotor through which the field current is passed is rotated, a three-phase AC voltage is induced in each of the armature coils 5*a* through 5*c*.

The three-phase full-wave rectifier 11 includes an inverter circuit of a type wherein SiC MOSFETs 11*a* through 11*f* are provided in a three-phase bridge connection. A high-potential DC output terminal of the three-phase full-wave rectifier 11 is connected to a high-potential terminal of a battery 9 and to one terminal of an electrical load 10 through the DC-DC converter 2, whereas a low-potential DC output terminal of the three-phase full-wave rectifier 11 is grounded together with a low-potential terminal of the battery 9 and the other end of the electrical load 10. Input/output terminals of the DC-DC converter 2 are connected in parallel with a short-circuit switch 21. The input/output terminals of the DC-DC converter 2 are individually connected to a pair of change-over terminals of a change-over switch 22. A common terminal of the change-over switch 22 is connected to one terminal of the field coil 4*c*. The other terminal of the field coil 4*c* is grounded through its corresponding switching transistor (not shown) for control of the field current which is provided by the controller 7. Further, the high-potential DC power terminal of the three-phase full-wave rectifier 11 is connected to one terminal of a high-voltage load 10 *a* (corresponding to a catalytic heater abbreviated as "EHC" in the Figure) through the switch 23. The other terminal of the high-voltage load 10 *a* is grounded. The three-phase full-wave rectifier 11 and the switches 21 through 23 are controlled by the controller 7.

The controller 7 preferably includes a microprocessor and PWM-controls a field current If. Further, the controller 7 generates gate voltage signals Ga through Gf based on voltage drop signals Pa through Pf (described late) which are individually inputted from their corresponding MOSFETs 11*a* through 11*f*, and applies the produced gate voltage signals Ga through Gf to the corresponding gate electrodes of the MOSFETs 11*a* through 11*f*.

The controller 7 PWM-controls the field current If in a mode for generating a low voltage so that a battery voltage VB coincides with a predetermined reference power-generating voltage value Vref1 and controls the three-phase full-wave rectifier 11 in a non-leading phase control mode (described later). Further, the controller 7 PWM-controls the field current If in a mode for generating a high voltage so that an output voltage Vo at the high-potential DC power terminal of the three-phase full-wave rectifier 11 matches or coincides with a predetermined reference power-generating voltage value Vref2 higher than the reference power-generating voltage value Vref1, and controls the three-phase full-wave rectifier 11 in a leading phase control mode (described later).

Figure 2:
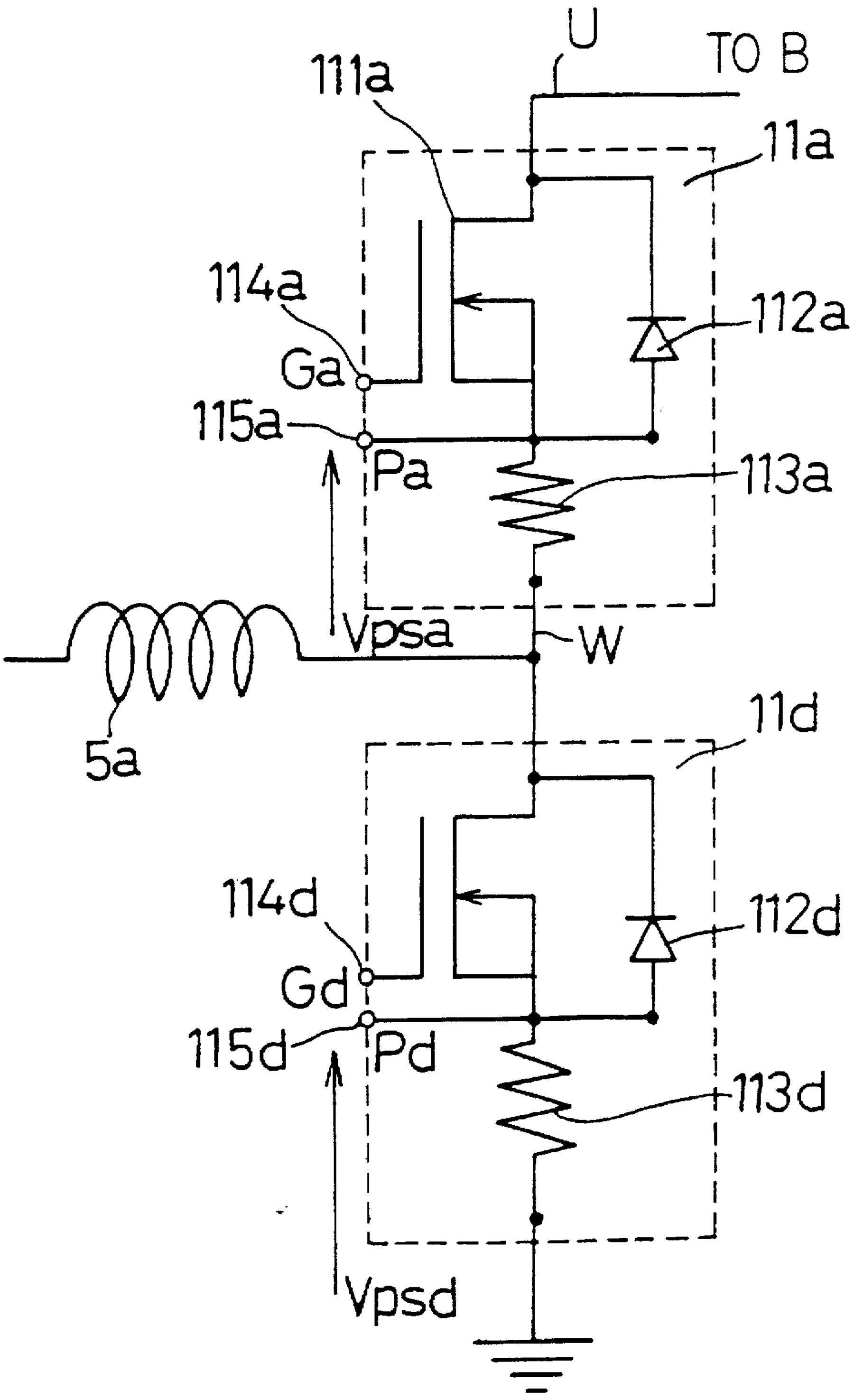
FIG. 2 is an equivalent circuit diagram illustrating one phase of a three-phase full-wave rectifier 11 shown in FIG. 1.

The controller 7 is able to read the field current from a small resistance element (not shown) connected in series with the field coil 4*c* and can read engine information from an engine control unit (ECU) (not shown) for controlling the automobile engine. An X-phase inverter of the three-phase full-wave rectifier 11 will now be described with reference to FIG. 2.

The MOSFET 11*a* which serves as a high side switch and the MOSFET 11*d* which serves as a low side switch are N-channel MOSFETs connected in series with one another. The MOSFET 11*a* has an N-type region on the armature coil side which serves as a drain region at the time of power generation, an N-type region on the battery side which serves as a source region at the time of the power generation, and a P-well region directly under the gate electrode 114*a* thereof. A PN junction between these N-type regions and the P-well region forms a parasitic diode.

In the present embodiment, the P-well region and the N-type region on the armature coil side have a small resistance 113*a* formed on a chip with an insulating film interposed therebetween by patterning a semiconductor or a metallic trace or the like having a predetermined resistivity. A channel current can be detected by detecting a voltage drop developed across the small resistance 113*a*.

Similarly, the MOSFET 11*d* has a small resistance 113*d*. The MOSFETs 11*b*, 11*e*, 11*c* and 11*f* for other phases also have small resistances similar to the small resistance 113*d*. The MOSFETs 11*a* through 11*f* respectively include terminals Pa through Pf for connecting the N-type region on the armature coil side and the small resistances. Incidentally, the parasitic diodes 112*a* and 112*d* of the MOSFETs 11*a* and 11*d* serve as current paths or channels used for supplying the power-generating current to the battery 9.

The timing for opening and closing each of the MOSFETs 11*a* through 11*f* of the three-phase full-wave rectifier 11 will be described.

Non-leading Phase Control Mode

One example of the control for performing the supply of a non-leading phase current will first be described. For simplicity of illustration, however, a description will be made of the case where the power-generating voltage is used under the adoption of the low-voltage generation mode.

Figures 3A, 3B, 3C, 3D:
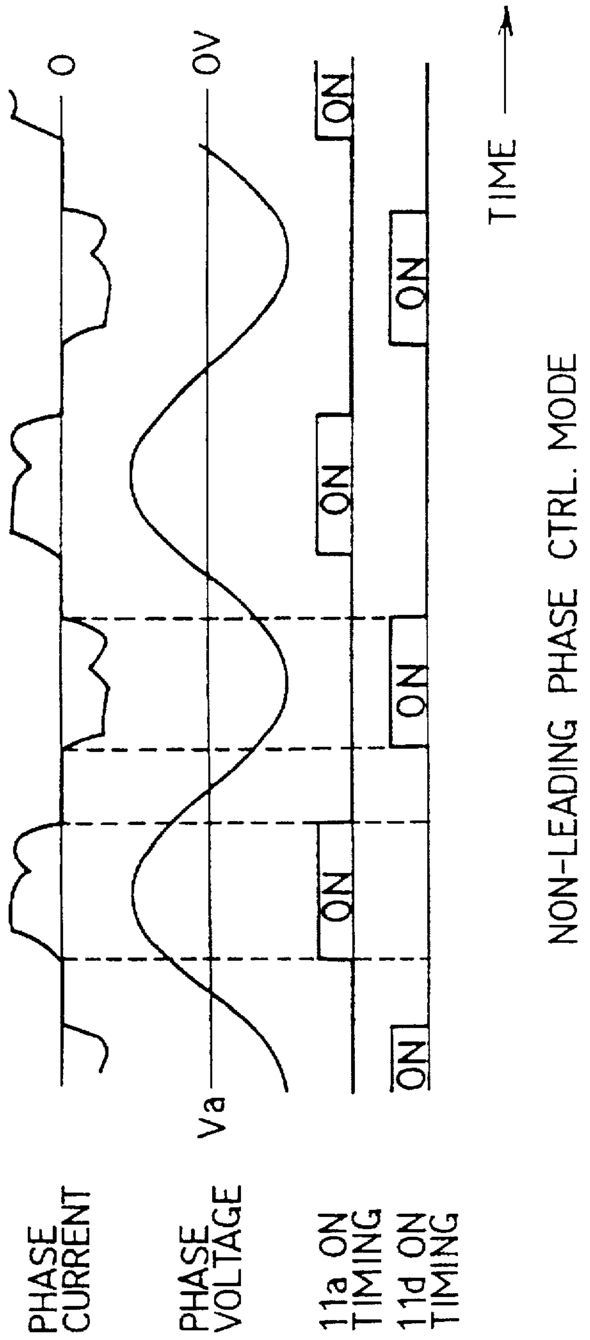
FIGS. 3A–3D are timing charts describing on-timing of MOSFETs 11*a* and 11*f* shown in FIG. 1 at the time of non-leading phase control.

FIG. 3B is a graph of a phase voltage Va developed in the armature coil 5*a*.

The control of the MOSFET 11*a*, which serves as the X-phase high side switch, is performed as follows. First, the controller 7 checks whether the phase voltage Va of the armature coil 5*a* is higher than the output voltage Vo and other phase voltages Vb and Vc. If the phase voltage Va is found to be higher than these voltages, then the MOSFET 11*a* is turned on. The turning off of the MOSFET 11*a* is carried out when the phase voltage Va has become lower than the output voltage Vo. The control for opening and closing of each of the MOSFETs 11*b* and 11*c* which serve as the high side switches of other phases, is performed in the same manner as described above.

The control of the MOSFET 11*d*, which serves as the X-phase low side switch, is performed as follows. First, the controller 7 checks whether the phase voltage Va of the armature coil 5*a* is lower than the ground voltage VE=0V and other phase voltages Vb and Vc. If the phase voltage Va is found to be lower than these voltages, then the MOSFET 11*d* is turned on. The turning off of the MOSFET 11*d* is carried out when the phase voltage Va has become higher than the ground voltage VE. The control for opening and closing of each of the MOSFETs 11*e* and 11*f* which serve as the high side switches of other phases is performed in the same manner as described above.

Figure 5:
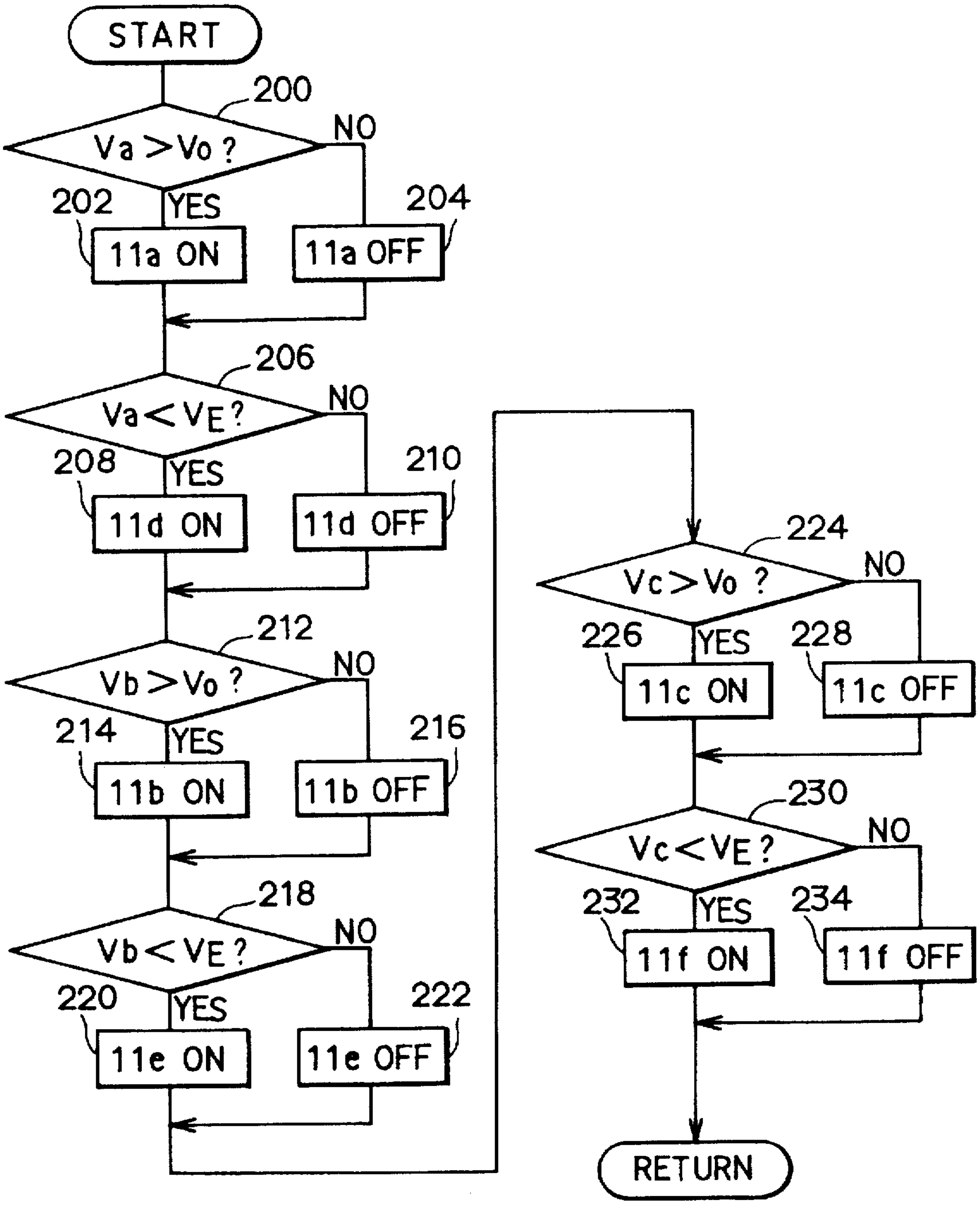
FIG. 5 is a flowchart explaining the control operation in the non-leading phase control mode shown in FIGS. 3A–3D.

One example of a routine for implementing a non-leading phase control mode will be described in accordance with the flowchart shown in FIG. 5. The subroutine shown in the flowchart will be executed while interrupting an unillustrated main routine at regular time intervals.

First, controller 7 checks whether a phase voltage Va of an X-phase exceeds the output voltage Vo (Step 200). If the answer is found to be YES at Step 200, then the high side switch 11*a* is turned on (Step 202). If the answer is found to be NO at Step 200, then the high side switch 11*a* is turned off (Step 204). A check is next made as to whether the phase voltage Va is smaller than 0V corresponding to a potential VE at the low-potential terminal of the battery 9 (Step 206). If the answer is found to be YES at Step 206, then the low side switch 11*d* is turned on (Step 208). If the answer is found to be NO at Step 206, then the low side switch 11*d* is turned off (Step 210).

Controller 7 then checks whether a phase voltage Vb of a Y-phase exceeds the output voltage Vo (Step 212). If the answer is found to be YES at Step 212, then the high side switch 11*b* is turned on (Step 214). If the answer is found to be NO at Step 212, then the high side switch 11*b* is turned off (Step 216). A check is next made as to whether the phase voltage Vb is lower than 0V corresponding to the potential VE at the low-potential terminal of the battery (Step 218). If the answer is found to be YES at Step 218, then the low side switch 11*e* is turned on (Step 220). If the answer is found to be NO at Step 218, then the low side switch 11*e* is turned off (Step 222).

The controller 7 next checks whether a phase voltage Vc of a Z-phase exceeds the output voltage Vo (Step 224). If the answer is found to be YES at Step 224, then the high side switch 11*c* is turned on (Step 226). If the answer is found to be NO at Step 224, then the high side switch 11*c* is turned off (Step 228). A check is next made as to whether the phase voltage Vc is lower than 0V corresponding to the potential VE at the low-potential terminal of the battery (Step 230). If the answer is found to be YES at Step 230, then the low side switch 11*f* is turned on (Step 232). If the answer is found to be NO at Step 230, then the low side switch 11*f* is turned off (Step 234). Thereafter, execution returns to the main routine.

Leading Phase Control Mode

Figures 4A, 4B, 4C, 4D, 4E, 4F:
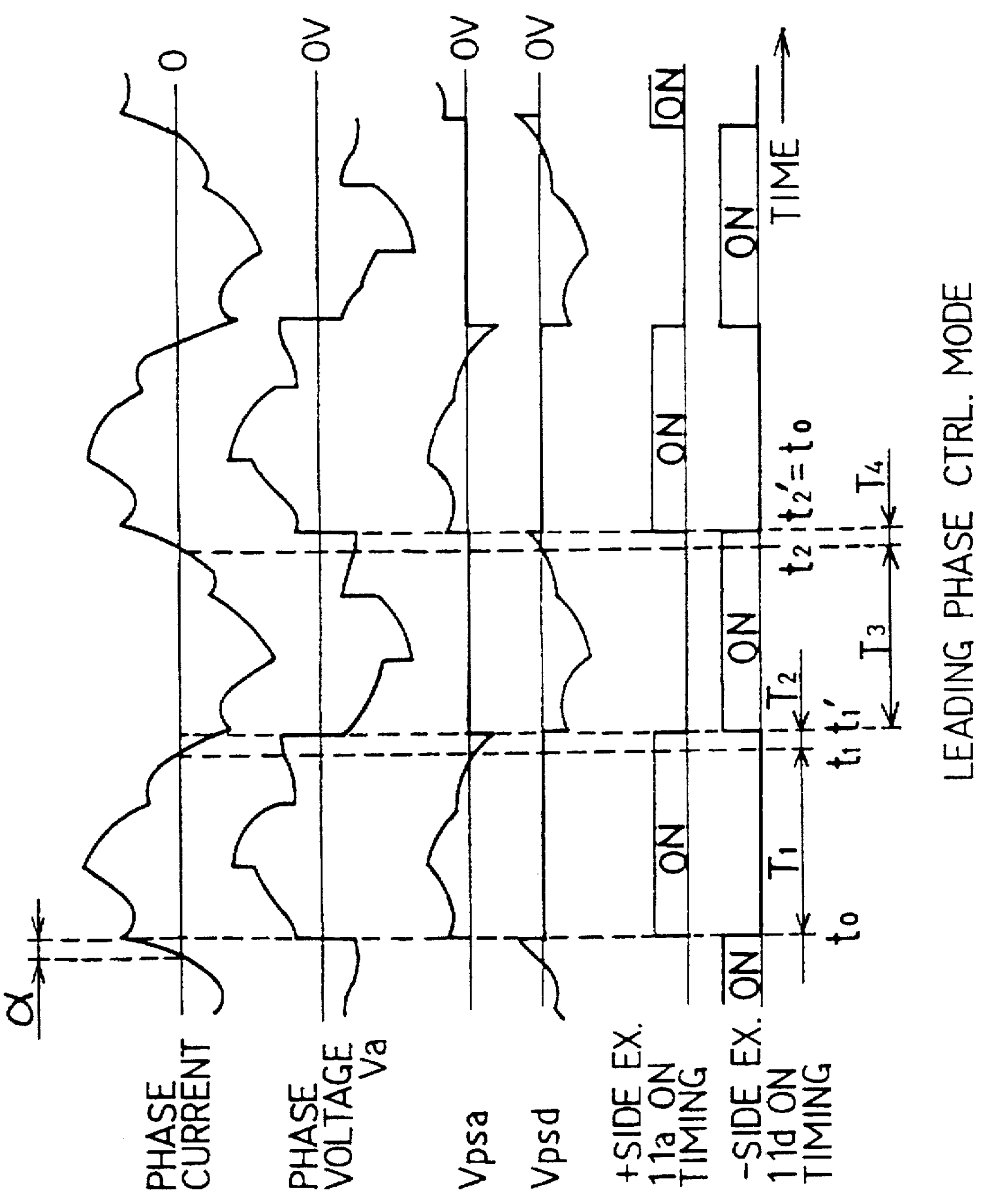
FIGS. 4A–4F are timing charts describing on-timing of the MOSFET 11*a* and a MOSFET 11*d* shown in FIG. 1 at the time of leading phase control.

One example of the control for performing the supply of the leading phase current will now be described. In the present embodiment, the supply of the leading phase current is adopted (in the high-voltage generation mode) where power is applied to the high-voltage load 10*a*. FIG. 4B is a graph of the phase voltage Va developed in the armature coil 5*a* under these conditions.

In the present embodiment, the turning-on timing of the MOSFET 11*a*, which serves as the high side switch, is provided at the time t2' (=t0) delayed by T4 (=T2) from a time t2 when a voltage drop Vpsd developed across the small resistance 113*d* changes from negative to positive. The turning-on timing of the other MOSFETs 11*b* and 11*c*, which serve as the high side switches for other phases, is provided in the same manner as described above. Further, the turning-on timing of the MOSFET 11*d*, which serves as the low side switch, is provided at the time t1' delayed by T2 from a time t1 when a voltage drop Vpsa developed across the low resistor 113*a* changes from positive to negative. The turning-on timing of each of other MOSFETs 11*e* and 11*f*, which serve as the low side switches of other phases, is provided in the same manner as described above.

On the other hand, the turning-off timing of each of the MOSFETs 11*a* through 11*f* is extended up to the timing after a phase period of about 180° from the turning-on timing in the present embodiment. Namely, the MOSFET 11*a* is turned off simultaneously with or immediately before the turning on of the MOSFET 11*d*, whereas the MOSFET 11*d* is turned off simultaneously with or immediately before the turning on of the MOSFET 11*a*.

In doing so, leading-phase current components are supplied to their corresponding armature coils 5*a*, 5*b* and 5*c* from the battery 9 due to delays at the time of turning off referred to above so that the magnetic field is increased. As shown in FIG. 4E, for example, even if the time t1 is reached, the MOSFET 11*a* is not turned OFF. Therefore, the OFF timing is delayed by the time interval T2. Similarly, as shown in FIG. 4F, the OFF timing of the MOSFET 11*d* is defined as the time t2' delayed by T4 (=T2) from the time t2. Further, the current can be drawn into each of the armature coils 5*a* through 5*c* from the battery 9. As a result, the current which precedes in phase the phase voltage by $\alpha$ (see FIG. 4A) for producing a field increasing action is supplied to the armature coil 5*a*. It is now necessary to set the sum of a charging interval or period T1 (=T3) and the OFF delay time T2(=T4) to an electrical angle of 180° or less. By performing a series of these controls while the Y phase is allowed to lag the X phase by an electrical angle of 120° (i.e., the Y phase is delayed by one-third of one cycle or period) and the Z phase is allowed to lead the X phase by an electrical angle of 120° (i.e., the Z phase is delayed by two-thirds of one period), the leading phase control over the three phases can be carried out.

One example of a routine for executing a leading phase control mode will be described in accordance with a flowchart shown in FIGS. 6 and 7.

In this routine, controller 7 first checks whether a flag F2 for making a decision as to whether the execution of the subroutine is regarded as the first execution or an execution subsequent to the first execution is 1 (Step 290). If the execution of the subroutine is found to be subsequent to the first execution (F2=1), then execution jumps to Step 300. If the execution of the subroutine is found to be the first execution (F2=0), then only the operation for bringing the MOSFETs 11*a* through 11*f* into conduction (i.e., turning them ON) is performed using the non-leading phase control routine shown in FIG. 5 (Step 292). Further, the flag F2 is set to 1 and execution proceeds to Step 300 (Step 294). Incidentally, the flag F2 will be reset to zero upon power-up.

At Step 300, the controller 7 checks whether the current or armature current ix flowing in the low side switch 11*d* changes from negative to positive i.e., from the direction in which the current flows into the stator winding 5*a* to the direction in which the current flows out into the low-potential DC power terminal (0V) during a turning-on period of the low side switch 11*d*. If the answer is found to be YES at Step 300, then an internal timer d is started (Step 302). If the answer is found to be NO at Step 300, it is then checked whether the current or armature current ix flowing in the high side switch 11*a* changes from positive to negative, i.e., from the direction in which the current flows out from the stator winding 5*a* to the high-potential DC power terminal to the direction in which the current flows into the stator winding 5*a* during a turning-on period of the high side switch 11*a* (Step 304). If the answer is found to be YES at Step 304, then an internal timer a is started (Step 306). If the answer is found to be NO at Step 304, then the routine procedure proceeds to Step 308.

At Step 308, the controller 7 checks whether the current or armature current iy flowing in the low side switch 11*e* changes from negative to positive i.e., from the direction in which the current flows into the stator winding 5*b* to the direction in which the current flows out into the low-potential DC power terminal (0V) during a turning-on period of the low side switch 11*e*. If the answer is found to be YES at Step 308, then an internal timer e is started (Step 310). If the answer is found to be NO at Step 308, it is then checked whether the current or armature current iy flowing in the high side switch 11*b* changes from positive to negative, i.e., from the direction in which the current flows out from the stator winding 5*b* to the high-potential DC power terminal to the direction in which the current flows into the stator winding 5*b* during a turning-on period of the high side switch 11*b* (Step 312). If the answer is found to be YES at Step 312, then an internal timer b is started (Step 314). If the answer is found to be NO at Step 312, then the routine procedure proceeds to Step 316.

In Step 316, the controller 7 checks whether the current or armature current iz flowing in the low side switch 11*f* changes from negative to positive i.e., from the direction in which the current flows into the stator winding 5*c* to the direction in which the current flows out into the low-potential DC power terminal (0V) during a turning-on period of the low side switch 11*f*. If the answer is found to be YES at Step 316, then an internal timer f is started (Step 318). If the answer is found to be NO at Step 316, it is then checked whether the current or armature current iz flowing in the high side switch 11*c* changes from positive to negative, i.e., from the direction in which the current flows out from the stator winding 5*c* to the high-potential DC power terminal to the direction in which the current flows into the stator winding 5*c* during a turning-on period of the high side switch 11*c* (Step 320). If the answer is found to be YES at Step 320, then an internal timer c is started (Step 322). If the answer is found to be NO at Step 320, then the routine procedure proceeds to Step 400.

At Step 400, a check is made as to whether the timer d has elapsed, i.e., only a predetermined delay time ΔT=T2=T4 has elapsed. If it is determined at Step 400 that the timer d has not elapsed, then execution proceeds directly to Step 404. If it is determined at Step 400 that the timer d has elapsed, then the low side switch 11*d* is turned off and the high side switch 11*a* is turned on. Further, the timer d is reset to zero and thereafter execution proceeds to Step 404.

In Step 404, the controller 7 checks to see whether the timer a has elapsed, i.e., only the predetermined delay time (leading-phase current carrying or energizing time) ΔT=T2=T4 has elapsed. If the answer is found to be NO at Step 404, then execution proceeds directly to Step 408. If the answer is found to be YES at Step 404, then the low side switch 11*d* is turned on and the high side switch 11*a* is turned off. Further, the timer a is reset to zero and thereafter execution proceeds to Step 408.

In Step 408, the controller 7 checks to see whether the timer e has elapsed, i.e., only the predetermined delay time ΔT=T2=T4 has elapsed. If the answer is found to be NO at Step 408, then execution proceeds directly to Step 412. If the answer is found to be YES at Step 408, then the low side switch 11*e* is turned off and the high side switch 11*b* is turned on. Further, the timer e is reset to zero and thereafter execution proceeds to Step 412.

In Step 412, the controller checks to see whether the timer b has elapsed, i.e., only the predetermined delay time ΔT=T2=T4 has elapsed. If the answer is found to be NO at Step 412, then execution proceeds directly to Step 416. If the answer is found to be YES at Step 412, then the low side switch 11*e* is turned on and the high side switch 11*b* is turned off. Further, the timer b is reset to zero and thereafter execution returns to the main routine.

In Step 416, the controller 7 checks whether the timer f has elapsed, i.e., only the predetermined delay time ΔT=T2=T4 has elapsed. If the answer is found to be NO at Step 416, then execution proceeds directly to Step 420. If the answer is found to be YES at Step 416, then the low side switch 11*f* is turned off and the high side switch 11*c* is turned on. Further, the timer f is reset to zero and thereafter execution proceeds to Step 420.

In Step 420, controller 7 checks to see whether the timer c has elapsed, i.e., only the predetermined delay time ΔT=T2=T4 has elapsed. If the answer is found to be NO at Step 420, then the routine ends. If the answer is found to be YES at Step 420, then the low side switch 11*f* is turned on and the high side switch 11*c* is turned off. Further, the timer c is reset to zero and thereafter the routine ends.

In this way, leading-phase current components are supplied to their corresponding armature coils 5*a*, 5*b* and 5*c* from the battery 9 due to delays at the time of turning off referred to above, so that the magnetic field is increased. For example, even if the time t1 is reached, the MOSFET 11*a* is not turned OFF. Therefore, the turning-off thereof is delayed by the time interval ΔT=T2=T4. Similarly, the turning-off of the MOSFET 11*d* is also defined as the time t2' delayed by ΔT =T2 =T4 from the time t2. Thus, the current can be drawn into each of the armature coils 5*a* through 5*c* from the battery 9. As a result, the current, which leads in phase the phase voltage by a (see FIGS. 4A and 4B) for producing a field increasing action is supplied to the stator coil 5*a*. It is now necessary to set the sum of a charging interval or period T1 (=T3) and the delay time ΔT=T2=T4 to a phase angle of 180° or less. Even if the Y phase is allowed to lag the X phase by a phase angle of 120° and the Z phase is allowed to lead the X phase by an electrical angle of 120° leading phase control over the three phases can be accomplished.

In the aforementioned embodiment, each of the switches 11*a* through 11*f* is turned on only during an interval of 180°. However, the turning-on period may be less than 180°. Since the period in which both the high side switch and the low side switch are turned off is produced in each phase inverter circuit in this case, the following control may be performed.

A description will be made of the X phase, for example. If the phase voltage Va of the stator winding 5*a* relative to the X phase becomes higher than the output voltage Vo at the high-potential DC power terminal of the three-phase full-wave rectifier 11 during the period in which the high side switch 11*a* and the low side switch 11*d* are turned off, then the high side switch 11*a* is turned on. On the other hand, the turning off of the turned-on high side switch 11*a* may be performed after the predetermined delay time ΔT has elapsed since the phase voltage Va has become lower than the output voltage Vo in the same manner as described above.

Similarly, if the phase voltage Va becomes lower than the ground potential during the period in which the high side switch 11*a* and the low side switch 11*d* are turned off, then the low side switch 11*d* is turned on. On the other hand, the turning off of the turned-on low side switch 11*d* may be carried out after the predetermined delay time ΔT has elapsed since the phase voltage Va has become lower than the ground voltage (0 V) in the same manner as described above.

The control on the Y and Z phases is also performed in the same manner as described above. Incidentally, the aforementioned device, opening/closing control is made to the X phase alone. The control of the Y and Z phases over the switches 11*b*, 11*c*, 11*e* and 11*f* may be performed with the X-phase switching timing shifted by 120°.

Second Embodiment

Figure 8:
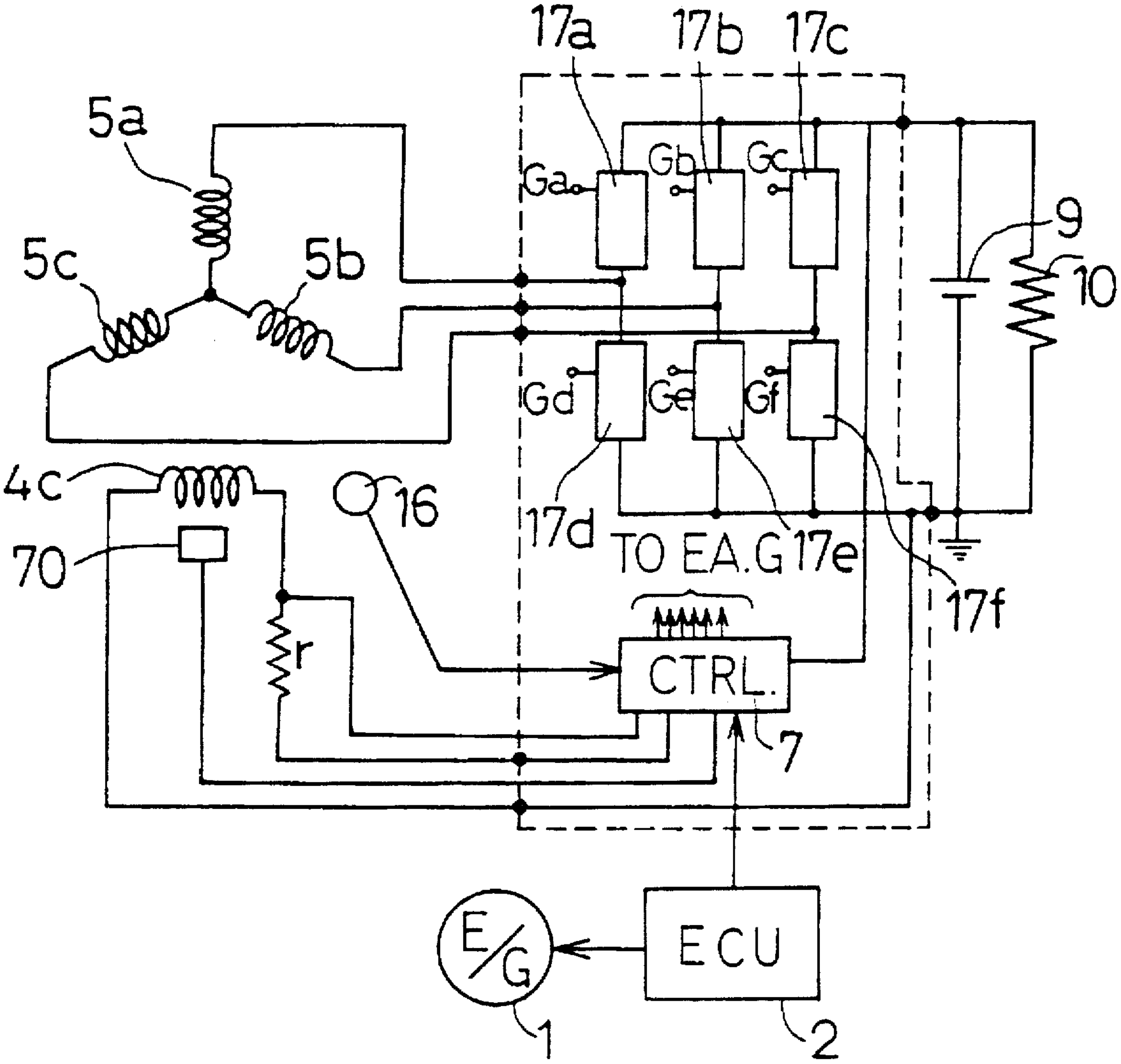
FIG. 8 is a block diagram illustrating a second embodiment of a vehicle power generating system according to the present invention.

FIG. 8 is a partial block circuit diagram of a second embodiment of the present invention. In this Figure, power generator 100*a* differs from the power generator 100 employed in the first embodiment shown in FIG. 1 in that the power generator 100*a* has a magnetic pole position detector (corresponding to the magnetic pole position detecting means recited in the appended claims) for detecting the position of each magnetic pole of a power generator rotor. MOSFETs 17*a* through 17*f* of a three-phase full-wave rectifier 17 shown in FIG. 8 are different from the MOSFETs 11*a* through 11*f* of the three-phase full-wave rectifier 11 of the first embodiment in that they do not have the small resistances for current detection.

Figures 9A, 9B, 9C, 9D, 9E, 9F, 9G, 9H, 9I, 9J, 9K, 9L, 9M, 9N, 9O:
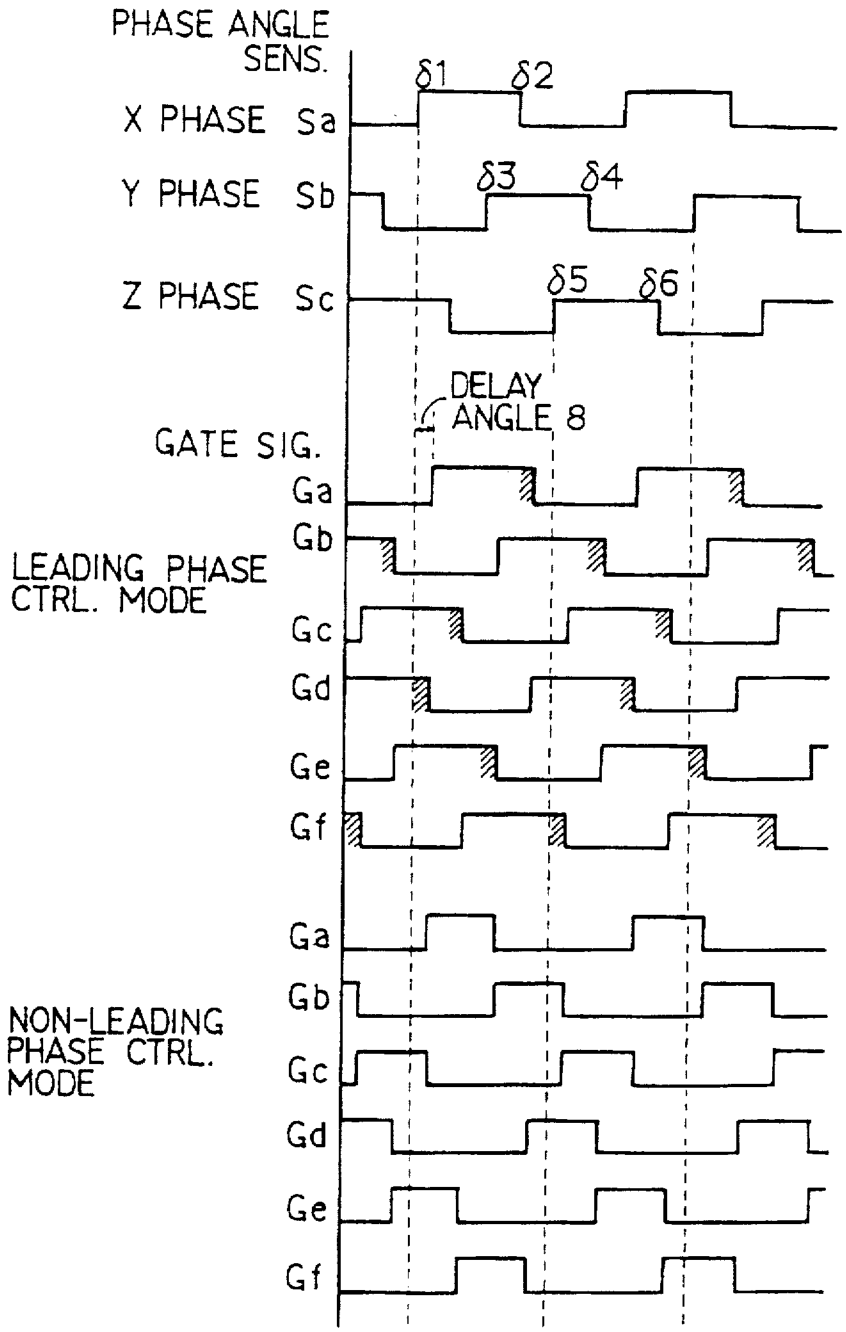
FIGS. 9A–9O are timing charts explaining the control operation in a leading-phase control mode of the circuit shown in FIG. 8.

The control for opening and closing each of the MOSFETs 17*a* through 17*f* employed in the present embodiment will now be described below with reference to the graphs shown in FIGS. 9A–9O.

In the present embodiment, the position of each magnetic pole of the rotor is detected by the magnetic pole position detector 16. The magnetic pole position detector 16 is preferably an absolute position encoding-type rotary encoder. Further, the magnetic pole position detector 16 outputs a reference pulse signal at a reference angular position and outputs a pulse signal at each predetermined angle. The controller 7 counts pulse signals and outputs phase angle signals Sa, Sb and Sc to control the MOSFETs 17*a* through 17*f*. The controller 7 outputs a high level at a phase angle δ1 at which a phase voltage Va corresponding to an output voltage from an armature coil (armature winding) *5a* of an X phase changes from negative to positive and outputs a low level at a phase angle δ2 at which the phase voltage Va changes from positive to negative. Further, the controller 7 outputs a high level at a phase angle δ3 at which a phase voltage Vb corresponding to an output voltage from an armature coil (armature winding) 5b of a Y phase changes from negative to positive and outputs a low level at a phase angle δ4 at which the phase voltage Vb changes from positive to negative. Furthermore, the controller 7 outputs a high level at a phase angle δ5 at which a phase voltage Vc corresponding to an output voltage from an armature coil (armature winding) 5c of a Z phase changes from negative to positive and outputs a low level at a phase angle δ6 at which the phase voltage Vc changes from positive to negative.

Since a non-leading phase control mode can be set in this embodiment similar to the one in the first embodiment, a leading phase control mode will be described below. The leading phase control employed in the present embodiment is as follows: As shown in FIGS. 9D and 9I, the MOSFET 17a and the MOSFET 17d are turned on and off at the time when the phase angle for the leading phase control lags behind the phase angle δ1 by a phase angle equivalent to a predetermined delay or lag angle 6. The MOSFET 17a and the MOSFET 17d are turned off and on at the time when the phase angle for the leading phase control lags behind the phase angle δ2 by the phase angle equivalent to the predetermined lag angle δ. The MOSFET 17b and the MOSFET 17e are respectively turned on and off at the time when the phase angle for the leading phase control lags behind the phase angle δ3 by the phase angle equivalent to the predetermined lag angle δ. The MOSFET 17b and the MOSFET 17e are respectively turned off and on at the time when the phase angle for the leading phase control lags behind the phase angle δ4 by the phase angle equivalent to the predetermined lag angle δ. The MOSFET 17c and the MOSFET 17f are respectively turned on and off at the time when the phase angle for the leading phase control lags behind the phase angle δ5 by the phase angle equivalent to the predetermined lag angle δ. Further, the MOSFET 17c and the MOSFET 17f are respectively turned off and on at the time when the phase angle for the leading phase control lags behind the phase angle δ6 by the phase angle equivalent to the predetermined lag angle δ.

The same leading phase control as that employed in the first embodiment can be achieved if done in this way. Incidentally, a method of setting a leading-phase current carrying or energizing time constructed of the delay time ΔT employed in the first embodiment and the lag angle δ employed in the second embodiment will be described below.

Third Embodiment

Figure 10:
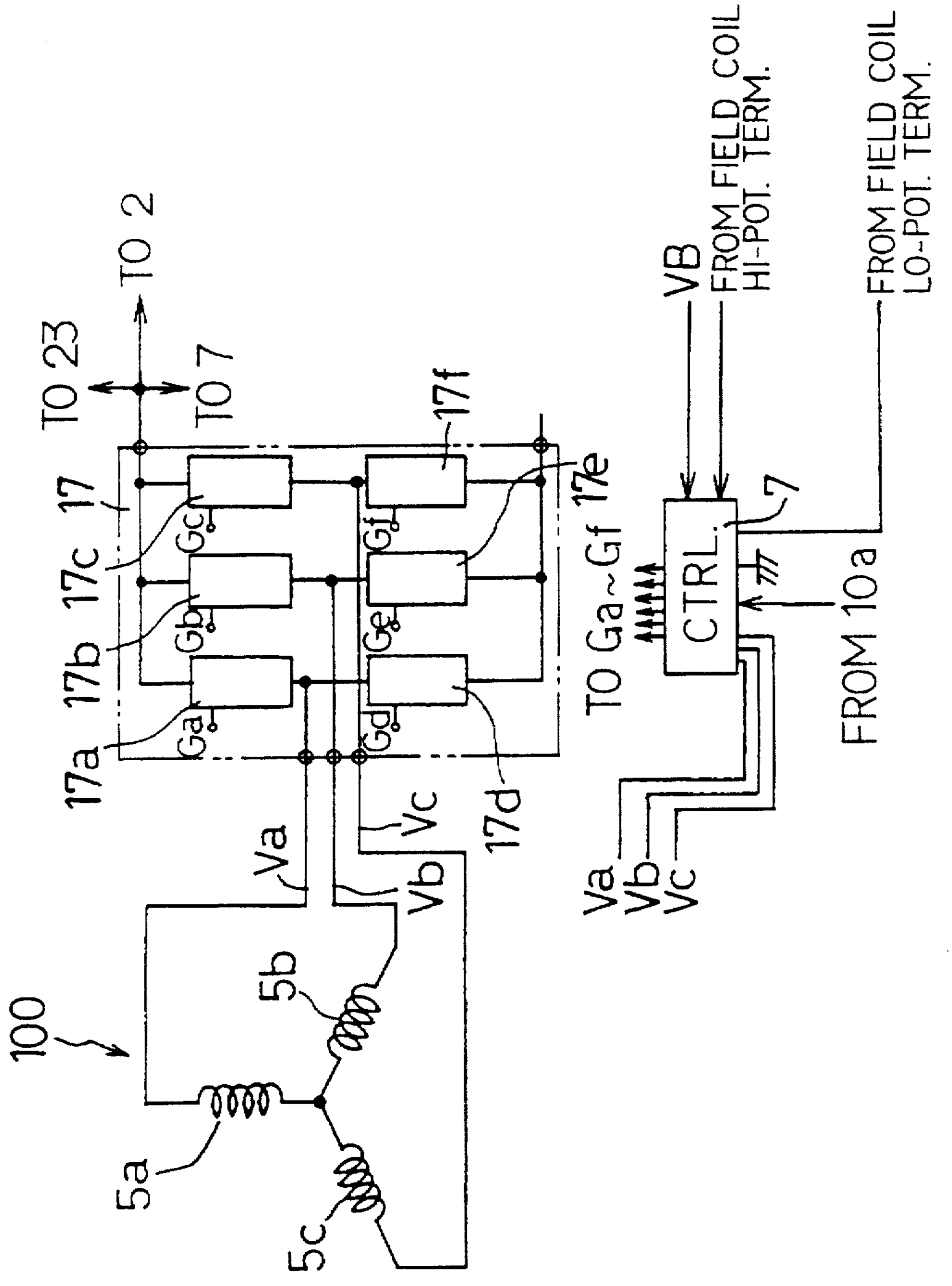
FIG. 10 is a block diagram showing a third embodiment of a vehicle power generating system according to the present invention.

A power generating system according to a third preferred embodiment of the present invention will now be described with reference to FIG. 10. The power generating system shown in FIG. 10 is of a type wherein the MOSFETs 11a through 11f of the three-phase full-wave rectifier 11 shown in FIG. 1 are respectively replaced by MOSFETs 17a through 17f excluding small resistances for current detection in a manner similar to the second embodiment.

Since the non-leading phase control in this embodiment can implement the control mode shown in FIG. 5, a leading-phase current control mode of the present embodiment will be described below with reference to the flowchart shown in FIGS. 6 and 7. The present embodiment is different from the first embodiment in that the opening/closing timing of each of the MOSFETs 17a through 17f is decided based on the difference in potential between the source and drain of each of the MOSFETs 17a through 17f. FIG. 6 shows a routine for making a decision about a zero-crossing point of each armature current, and FIG. 7 shows a routine for controlling the opening/closing of each of the MOSFETs 17a through 17f. The present embodiment is different from the first embodiment in which the zero-crossing point is detected based on the voltage drop developed across each resistance only in that the zero-crossing point of each armature current is determined based on the difference in potential between the source and drain of each of the MOSFETs 17a through 17f.

Figure 6:
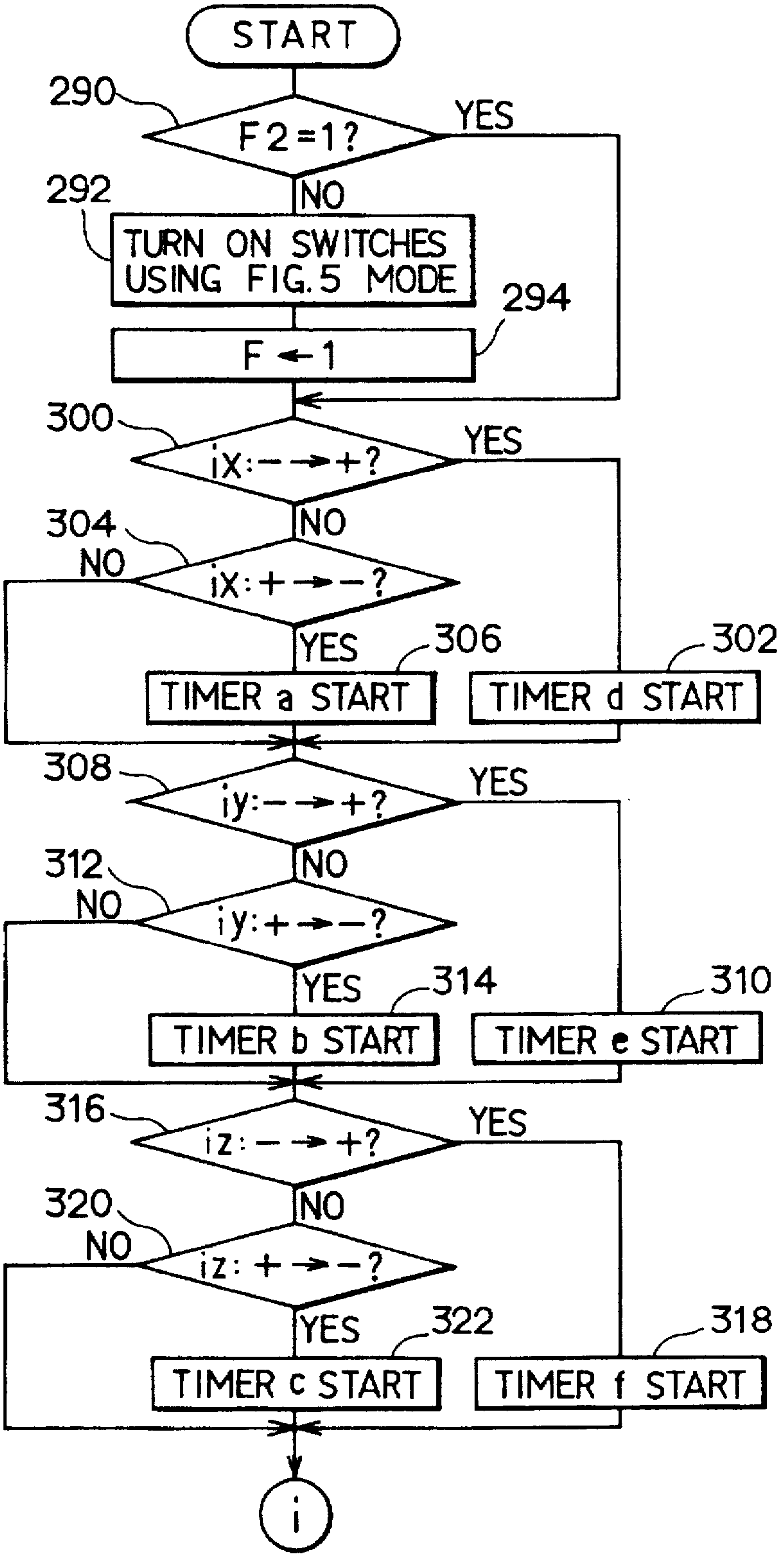
FIGS. 6 and 7 are a flowchart explaining the control operation in the leading phase control mode shown in FIGS. 4A–4F.

Referring to FIG. 6, controller 7 first checks whether a flag F2 for making a decision as to whether the execution of the routine is either the first execution or an execution subsequent to the first execution, is 1 (Step 290). If the execution of the routine is found to be an execution subsequent to the first execution (F2=1), then execution jumps to Step 300. If the execution of the routine is found to be the first execution (F2=0), then only the operation for bringing the MOSFETs 17a through 17f into conduction (i.e., turning them on) is performed using the routine shown in FIG. 5 (Step 292). Further, the flag F2 is set to 1 and execution proceeds to Step 300 (Step 294). Incidentally, the flag F2 will be reset to zero upon power-up.

At Step 300, controller 7 checks whether the current or armature current ix flowing in the low side switch 17d changes from negative to positive i.e., from the direction in which the current flows into the stator winding 5a to the direction in which the current flows out into the low-potential DC power terminal (0V), depending on whether Va has become greater than or equal to 0V during a turning-on period of the low side switch 17d. If the answer is found to be YES at Step 300, then a self-contained timer d is started (Step 302). If the answer is found to be NO at Step 300, it is then checked whether the current or armature current ix flowing in the high side switch 17a changes from positive to negative, i.e., from the direction in which the current flows out from the stator winding 5a to the high-potential DC power terminal to the direction in which the current flows into the stator winding 5a, depending on whether the phase voltage Va has become smaller than or equal to an output voltage Vo during a turning-on period of the high side switch 17a (Step 304). If the answer is found to be YES at Step 304, then a self-contained timer a is started (Step 306). If the answer is found to be NO at Step 304, then execution proceeds to Step 308.

At Step 308, controller 7 checks whether the current or armature current iy flowing in the low side switch 17e changes from negative to positive, i.e., from the direction in which the current flows into the stator winding 5b to the direction in which the current flows out into the low-potential DC power terminal (0V), depending on whether Vb has become greater than or equal to 0V during a turning-on period of the low side switch 17e. If the answer is found to be YES at Step 308, then an internal timer e is started (Step 310). If the answer is found to be NO at Step 308, it is then checked whether the current or armature current iy flowing in the high side switch 17b changes from positive to negative, i.e., from the direction in which the current flows out from the stator winding 5b to the high-potential DC power terminal to the direction in which the current flows into the stator winding 5b, depending on whether the phase voltage Vb has become less than or equal to the output voltage Vo during a turning-on period of the high side switch 17*b* (Step 312). If the answer is found to be YES at Step 312, then an internal timer b is started (Step 314). If the answer is found to be NO at Step 312, then execution proceeds to Step 316.

At Step 316, controller 7 checks whether the current or armature current iz flowing in the low side switch 17*f* changes from negative to positive i.e., from the direction in which the current flows into the stator winding 5*c* to the direction in which the current flows out into the low-potential DC power terminal (0V), depending on whether Vc has become greater than or equal to 0V during a turning-on period of the low side switch 17*f*. If the answer is found to be YES at Step 316, then an internal timer f is started (Step 318). If the answer is found to be NO at Step 316, it is then checked whether the current or armature current iz flowing in the high side switch 17*c* changes from positive to negative, i.e., from the direction in which the current flows out from the stator winding 5*c* to the high-potential DC power terminal to the direction in which the current flows into the stator winding 5*c*, depending on whether the phase voltage Vc has become smaller than or equal to the output voltage Vo during a turning-on period of the high side switch 17*c* (Step 320). If the answer is found to be YES at Step 320, then an internal timer c is started (Step 322). If the answer is found to be NO at Step 320, then execution proceeds to Step 400.

At Step 400, a check is made as to whether the timer d has elapsed, i.e., only a predetermined delay time ΔT=T2=T4 has elapsed. If it is determined at Step 400 that the timer d has not elapsed, then execution proceeds directly to Step 404. If it is determined at Step 400 that the timer d has elapsed, then the low side switch 17*d* is turned off and the high side switch 17*a* is turned on. Further, the timer d is reset to zero and thereafter execution proceeds to Step 404.

At Step 404, controller 7 checks whether the timer a has elapsed, i.e., only the predetermined delay time ΔT=T2=T4 has elapsed. If the answer is found to be NO at Step 404, then execution proceeds directly to Step 408. If the answer is found to be YES at Step 404, then the low side switch 17*d* is turned on and the high side switch 17*a* is turned off. Further, the timer a is reset to zero and thereafter execution proceeds to Step 408.

At Step 408, controller 7 checks whether the timer e has elapsed, i.e., only the predetermined delay time ΔT=T2=T4 has elapsed. If the answer is found to be NO at Step 408, then execution proceeds directly to Step 412. If the answer is found to be YES at Step 408, then the low side switch 17*e* is turned off and the high side switch 17*b* is turned on. Further, the timer e is reset to zero and thereafter execution proceeds to Step 412.

At Step 412, controller 7 checks whether the timer b has elapsed, i.e., only the predetermined delay time ΔT=T2=T4 has elapsed. If the answer is found to be NO at Step 412, then execution proceeds directly to Step 416. If the answer is found to be YES at Step 412, then the low side switch 17*e* is turned on and the high side switch 17*b* is turned off. Further, the timer b is reset to zero and thereafter execution proceeds to Step 416.

At Step 416, the controller 7 checks whether the timer f has elapsed, i.e., only the predetermined delay time ΔT=T2=T4 has elapsed. If the answer is found to be NO at Step 416, then execution proceeds directly to Step 420. If the answer is found to be YES at Step 416, then the low side switch 17*f* is turned off and the high side switch 17*c* is turned on. Further, the timer f is reset to zero and thereafter execution proceeds to Step 420.

At Step 420, the controller 7 checks whether the timer c has elapsed, i.e., only the predetermined delay time ΔT=T2=T4 has elapsed. If the answer is found to be NO at Step 420, then execution of the routine ends. If the answer is found to be YES at Step 420, then the low side switch 17*f* is turned on and the high side switch 17*c* is turned off. Further, the timer c is reset to zero and thereafter execution returns to the main routine.

Fourth Embodiment

Figure 11:
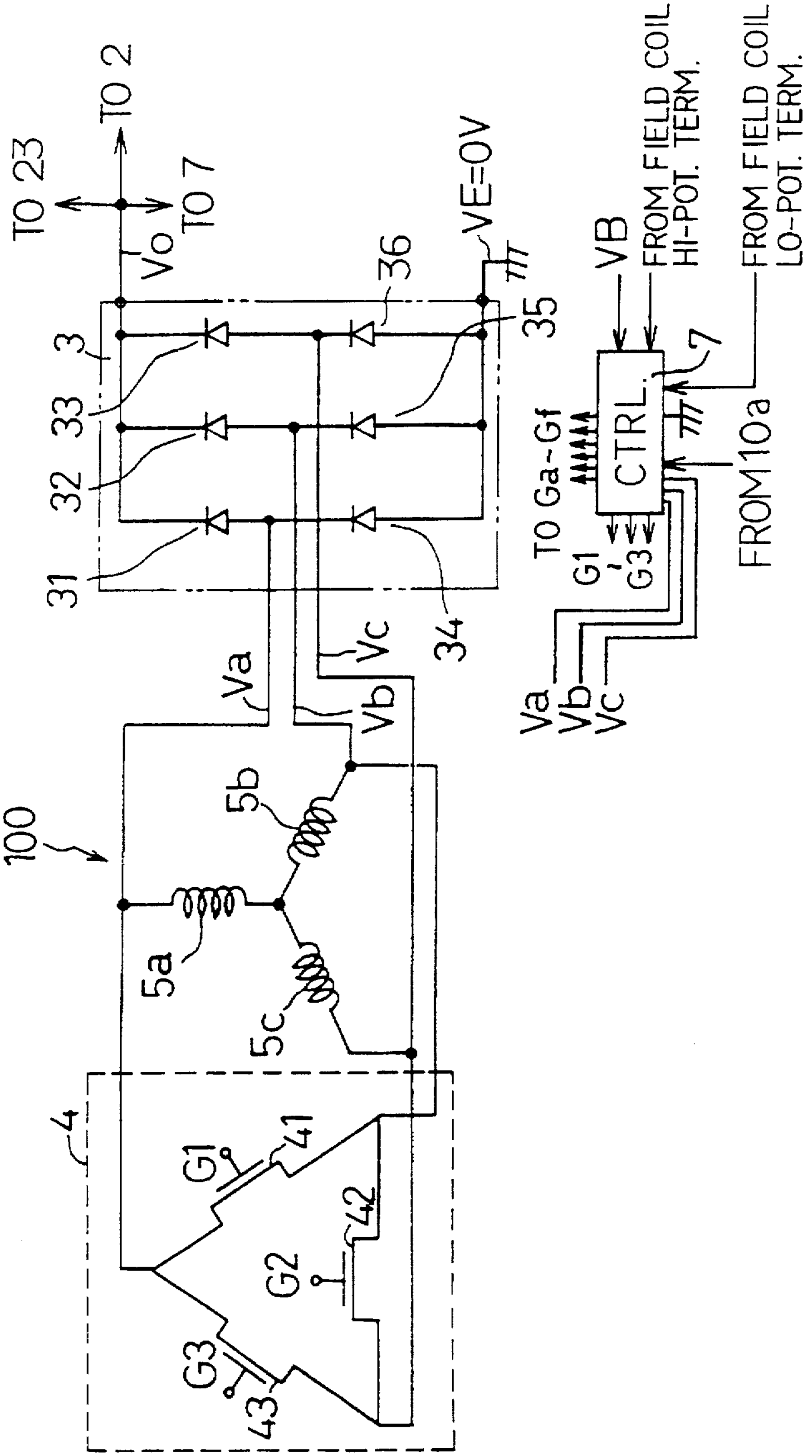
FIG. 11 is a block diagram illustrating a fourth embodiment of a vehicle power generating system according to the present invention.

A fourth embodiment of the present invention will be described with reference to FIG. 11 in which a delta short-circuiting circuit 4 is connected to the armature windings 5*a*, 5*b* and 5*c* in the circuit employed in the third embodiment shown in FIG. 10 (the short-circuiting circuit 4 and controller 7 constitute a leading-phase current supplying or carrying means as recited in the appended claims).

The short-circuiting circuit 4 includes three MOSFETs (short-circuit switches) 41 through 43 in the form of a delta connection. The MOSFET 41 is connected to an output terminal of the armature winding 5*a* and an output terminal of the armature winding 5*b*. The MOSFET 42 is connected to the output terminal of the armature winding 5*b* and an output terminal of the armature winding 5*c*. Finally, the MOSFET 43 is connected to the output terminal of the armature winding 5*c* and the output terminal of the armature winding 5*a*.

The controller 7 brings each of the short-circuit switches 41 through 43 into conduction to supply a leading phase current as will be described later. Of course, since phase voltages Va through Vc may be rectified by a three-phase full-wave rectifier 3 after the short-circuit switches 41 through 43 have been cut off, non-leading phase control mode will not be described in detail. In the present embodiment as well, the phase voltage Va will lead the phase voltage Vb by 120° and the phase voltage Vb will lead the phase voltage Vc by 120° . For simplicity of illustration in the present embodiment, forward voltage drops developed across diodes 31 through 36 of the three-phase full-wave rectifier 3 will be neglected.

Figure 12:
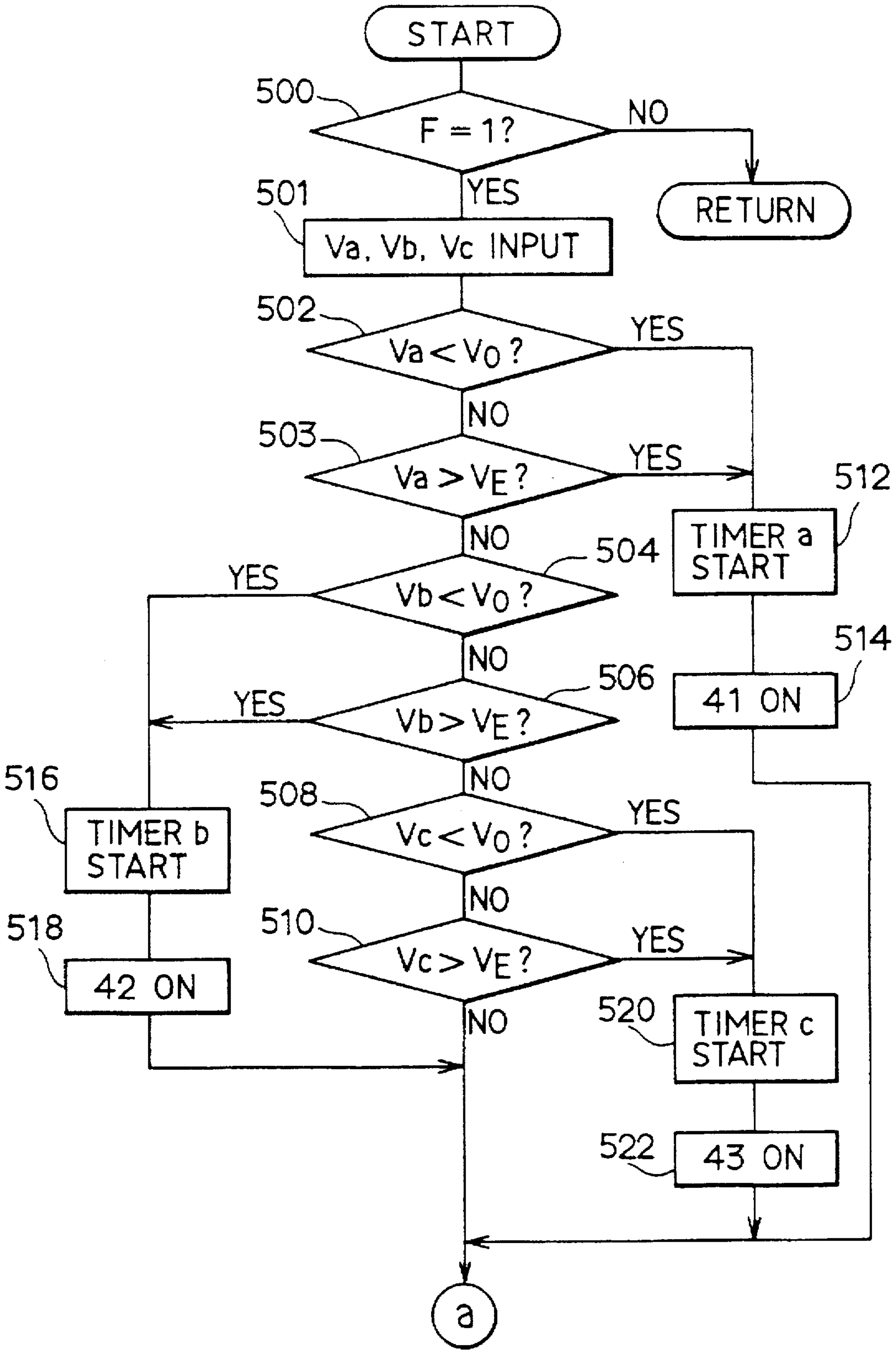
FIGS. 12 and 13 are a flowchart describing the control operation in a leading phase control mode of the circuit shown in FIG. 11.
Figure 13:
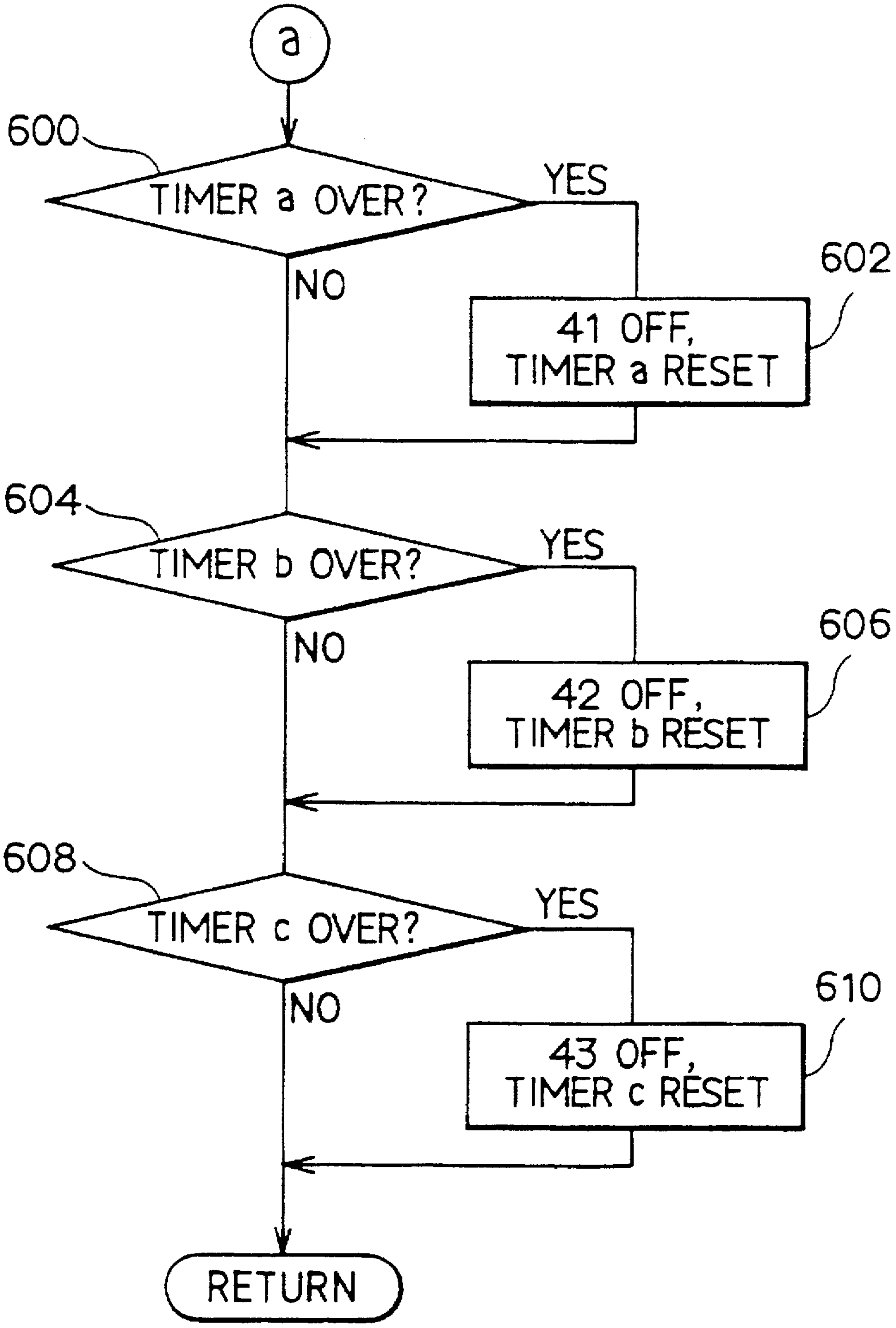

The leading-phase current control of the present embodiment will be described below with reference to the flowchart shown in FIGS. 12 and 13. A subroutine shown in FIGS. 12 and 13 is an interrupt routine preferentially executed at predetermined time intervals. Incidentally, the present leading phase control mode will be also executed in a high-voltage generation mode.

In Step 500, the controller 7 checks whether a flag F for enabling execution of the short-circuit control is 1. If the flag F is found to be zero at Step 500, then execution returns to a main routine due to the absence of the enablement of execution of the short-circuit control. If the flag F is found to be 1 at Step 500, then execution proceeds to Step 501 due to the presence of the enablement of execution of the short-circuit control.

At Step 501, the phase voltages Va through Vc are read. A check is next made as to whether the read phase voltage Va is less than an output voltage Vo at a high-potential DC power terminal of the three-phase full-wave rectifier 3 (Step 502). If the answer is found to be NO at Step 502, then execution proceeds to Step 503. If the answer is found to be YES at Step 502, then execution proceeds to Step 512. At Step 503, the controller 7 checks whether the phase voltage Va is greater than a ground voltage VE (=0V). If the answer is found to be NO at Step 503, then execution proceeds to Step 504. If the answer is found to be YES at Step 503, then execution proceeds to Step 512. At Step 512, a timer a for setting a conduction time of the short-circuit switch 41 is started to immediately turn on the short-circuit switch 41 (Step 514). Thereafter, execution proceeds to Step 600.

At Step 504, the controller 7 checks whether the phase voltage Vb is smaller than the output voltage Vo. If the answer is found to be NO at Step 504, then execution proceeds to Step 506. If the answer is found to be YES at Step 504, then execution proceeds to Step 516. It is next checked at Step 506 whether the phase voltage Vb is greater than the ground voltage VE (=0V). If the answer is found to be NO at Step 506, then execution proceeds to Step 508. If the answer is found to be YES at Step 506, then execution proceeds to Step 516. At Step 516, a timer b for setting a conduction time of the short-circuit switch 42 is started to immediately turn on the short-circuit switch 42 (Step 518). Thereafter, execution proceeds to Step 600.

At Step 508, the controller 7 checks whether the phase voltage Vc is smaller than the output voltage Vo. If the answer is found to be NO at Step 508, then execution proceeds to Step 510. If the answer is found to be YES at Step 508, then execution proceeds to Step 520. It is next checked at Step 510 whether the phase voltage Vc is greater than the ground voltage VE (=0V). If the answer is found to be NO at Step 510, then execution proceeds to Step 600. If the answer is found to be YES at Step 510, then execution proceeds to Step 520. At Step 520, a timer c for setting a conduction time of the short-circuit switch 43 is started to immediately turn on the short-circuit switch 43 (Step 522). Thereafter, execution proceeds to Step 600.

Incidentally, the reason why execution jumps to Step 600 immediately after completion of Steps 514 and 518 is that the routine shown in FIGS. 12 and 13 is regularly and frequently executed and the short-circuit switches 41 through 43 are not turned on together due to the differences in phase between the short-circuit switches 41 through 43 within a single routine cycle time. Further, a predetermined delay time ΔT calculated or preset by an embodiment to be described later will be set in each of the timers a, b and c.

In the following Step 600, the controller 7 checks whether a value counted by the timer a has reached the delay time ΔT set in the timer a. If the answer is found to be NO at Step 600, then execution proceeds to Step 604. If the answer is found to be YES at Step 600, then the short-circuit switch 41 is turned off and the timer a is reset (602). Thereafter, execution proceeds to Step 604.

In the following Step 604, the controller 7 checks whether a value counted by the timer b has reached the delay time ΔT set in the timer b. If the answer is found to be NO at Step 604, then execution proceeds to Step 608. If the answer is found to be YES at Step 604, then the short-circuit switch 42 is turned off and the timer b is reset (606). Thereafter, execution proceeds to Step 608.

In Step 608, the controller 7 checks whether a value counted by the timer c has reached the delay time ΔT set in the timer c. If the answer is found to be NO at Step 608, then execution returns to the main routine (not shown). If the answer is found to be YES at Step 608, then the short-circuit switch 43 is turned off and the timer c is reset (610). Thereafter, execution returns to the main routine.

If the discharged or outflow currents are brought to zero, then the leading phase currents (short-circuit currents) flow into their corresponding armature windings 5*a*, 5*b* and 5*c* through the short-circuit switches 41 through 43 owing to the above operation, whereas if the inflow currents are brought to zero, then the leading phase currents (short-circuit currents) flow out through the short-circuit switches 41 through 43, whereby the supply of the leading phase currents can be achieved.

An electromagnetic phenomenon produced by the conduction control of the short-circuit switch 41 will now be described below with reference to FIGS. 4A–4F.

In the present embodiment, the passage of the short-circuit current through its corresponding armature winding is started at a time t1 and completed at a time (hereinafter called "t1'") when a short-circuit time is brought to an end. When no short-circuit current is supplied, the phase voltage Va is normally smaller than the output voltage Vo but is a value greater than a voltage (0V) at a low-potential DC power terminal. When the short-circuit current is not supplied, the phase current ia does not flow in the stator winding 5*a* from the low-potential DC power terminal after the elapse of the time t1'. However, when the short-circuit phase current is caused to flow into the stator winding 5*a* of the stator windings during a period from the time t1 to the time t1', a counterelectromotive force developed in the stator winding 5*a* upon the turning off of the short-circuit switch 41 at the time t1' is produced in the direction of reducing the potential or the phase voltage Va at an output terminal of the stator winding 5*a*. Therefore, the phase voltage Va is reduced by the produced counterelectromotive force and hence the phase voltage Va becomes lower than the potential (0V) at the low-potential DC power terminal. As a result, the current is able to flow from the low-potential DC power terminal to the stator winding 5*a* through the diode 34.

In other words, electromagnetic energy is stored in the stator winding 5*a* owing to the passage of the short-circuit current through the stator winding 5*a* and the electromagnetic energy is released after the time t1'. The current that flows subsequently to the time t1', is recovered by a battery 9 through a high-potential DC power terminal. For similar reasons, when the short-circuit current flows out from the stator winding 5*a* during a period from a time t2 to a time t2', electromagnetic energy is stored in the stator winding 5*a* owing to the passage of the short-circuit current therethrough and the electromagnetic energy is released after the time t2'. The current that flows subsequently to the time t2' is recovered by the battery 9 through the high-potential DC power terminal.

The present embodiment can bring about an excellent advantageous effect in that since the leading phase current is supplied through each of the short-circuit switches 41 through 43 referred to above, the battery 9 is not discharged even in the event that these switches are brought into cut-off disable states, whereby safety is ensured.

Fifth Embodiment

Figure 14:
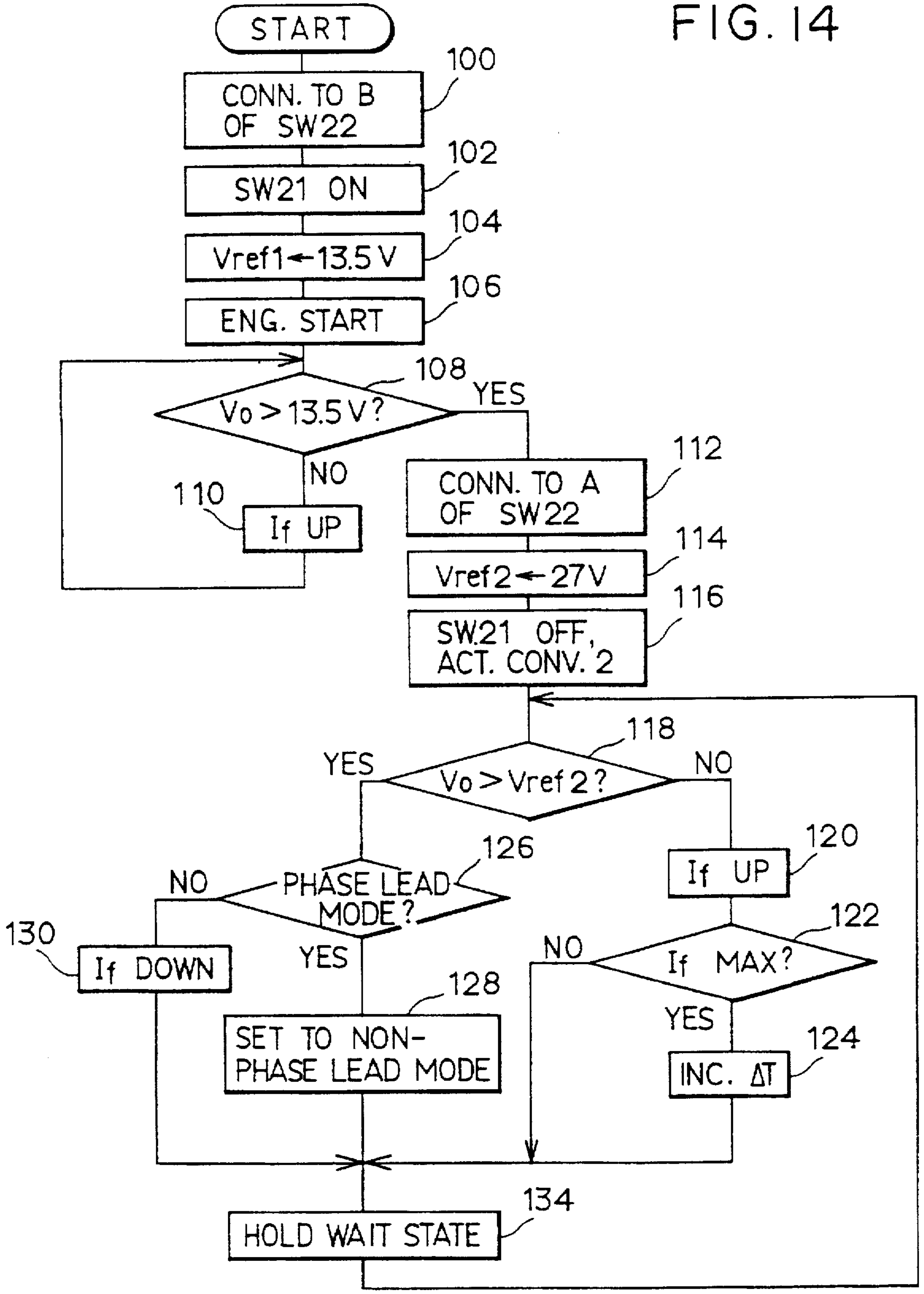
FIG. 14 is a flowchart describing a fifth embodiment of a vehicle power generating system according to the present invention.

A fifth embodiment of the present invention as it relates to the leading-phase control mode or non-leading phase control mode described in the aforementioned embodiments will be described below with reference to a flowchart shown in FIG. 14. In the present embodiment, the leading phase current is supplied in a state in which the off timing of each of the MOSFETs 11*a* through 11*f* has been delayed by the current detection resistances shown in FIG. 2.

Firstly, power is turned on and an initial reset is executed. Thereafter, the change-over switch 22 is connected to the battery side (Step 100) to bring the short-circuit switch 21 into conduction.

Further, a first adjusted voltage Vref1 (=13.5 V) is set to an adjusted-voltage storage register of the CPU in the controller 7 as an adjusted voltage at the time of the low-voltage generation mode (Step 104). The engine is started up and the field current is supplied to the field coil 4c to start power generation (Step 106).

At the following Step 108, the output voltage Vo of the three-phase full-wave rectifier 11 is compared with the first adjusted voltage Vref1. If Step 108 determines that the first adjusted voltage Vref1 is greater than the output voltage Vo, then the conduction rate or conductivity of the switching transistor (not shown) for control of the field current is raised (Step 110) and execution thereafter returns to Step 108. If Step 108 determines that the output voltage Vo is greater than the first adjusted voltage Vref1, then the change-over switch 22 is connected to the output terminal side of the three-phase full-wave rectifier 11 (Step 112). Further, a second adjusted voltage Vref2 (=27 V) is set in the adjusted-voltage storage register as an adjusted voltage at the time of the high-voltage generation mode (Step 114). Thereafter, the short-circuit switch 21 is opened to activate the DC-DC converter 2 so that the DC-DC converter 2 reduces the output voltage Vo of the three-phase full-wave rectifier 11 to 13.5 V and supplies its reduced voltage to each of the electrical load 10 and the battery 9 (Step 116).

Next, the output voltage Vo is compared with the second adjusted voltage Vref2 (Step 118). If Step 118 determines that the output voltage Vo is less than the second adjusted voltage Vref2, then the conductivity of the switching transistor (not shown) for control of the field current is raised to increase the field current (Step 120). It is further checked whether the conductivity thereof is 100% (Step 122). If the answer is found to be NO at Step 122, then execution proceeds to Step 134. If the answer is found to be YES at Step 122, then execution proceeds to Step 124 where the delay time ΔT=T2=T4 is increased by a predetermined small value, after which execution proceeds to Step 134. At Step 134, a waiting state is held for a predetermined time interval to adjust a routine cyclic speed and thereafter execution returns to Step 118.

Figure 7:
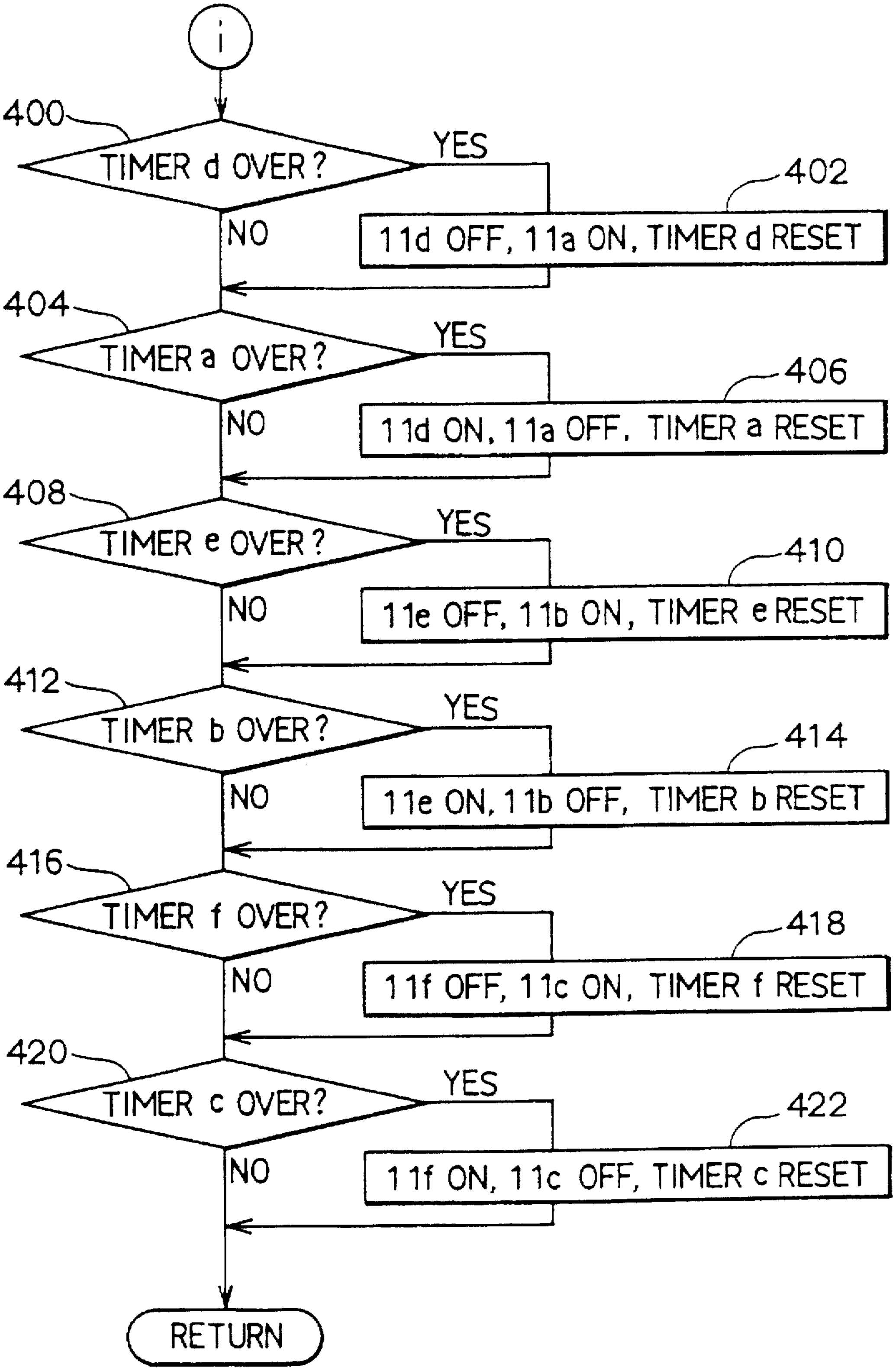

When the delay time ΔT=T2=T4 has reached a value greater than zero, the leading phase control mode shown in FIGS. 6 and 7 is interrupted and executed at predetermined intervals. At this time, the delay time ΔT is set in each of the timers a through f. Thus, when the power-generating voltage is not maintained at the second adjusted voltage Vref2 by the increase in field current alone upon execution of the high-voltage generation mode, the power-generating voltage is increased under the supply of the leading phase current.

On the other hand, when the output voltage Vo exceeds 27 V at Step 118, the controller 7 checks whether the leading phase control mode is presently being executed, i.e., the delay time ΔT is greater than zero (Step 126). If the answer is found to be YES at Step 126 (i.e., if it is determined at Step 126 that the delay time ΔT is greater than zero), then the control mode is set to a non-leading phase control mode (Step 128) and thereafter execution proceeds to Step 134.

If the answer is found to be NO at Step 126, then the conductivity of the switching transistor for control of the field current is immediately reduced by a predetermined small value (Step 130). Thereafter, a standby state is held for a predetermined time to adjust the routine cyclic speed (Step 134) and execution returns to Step 118.

Figure 15:
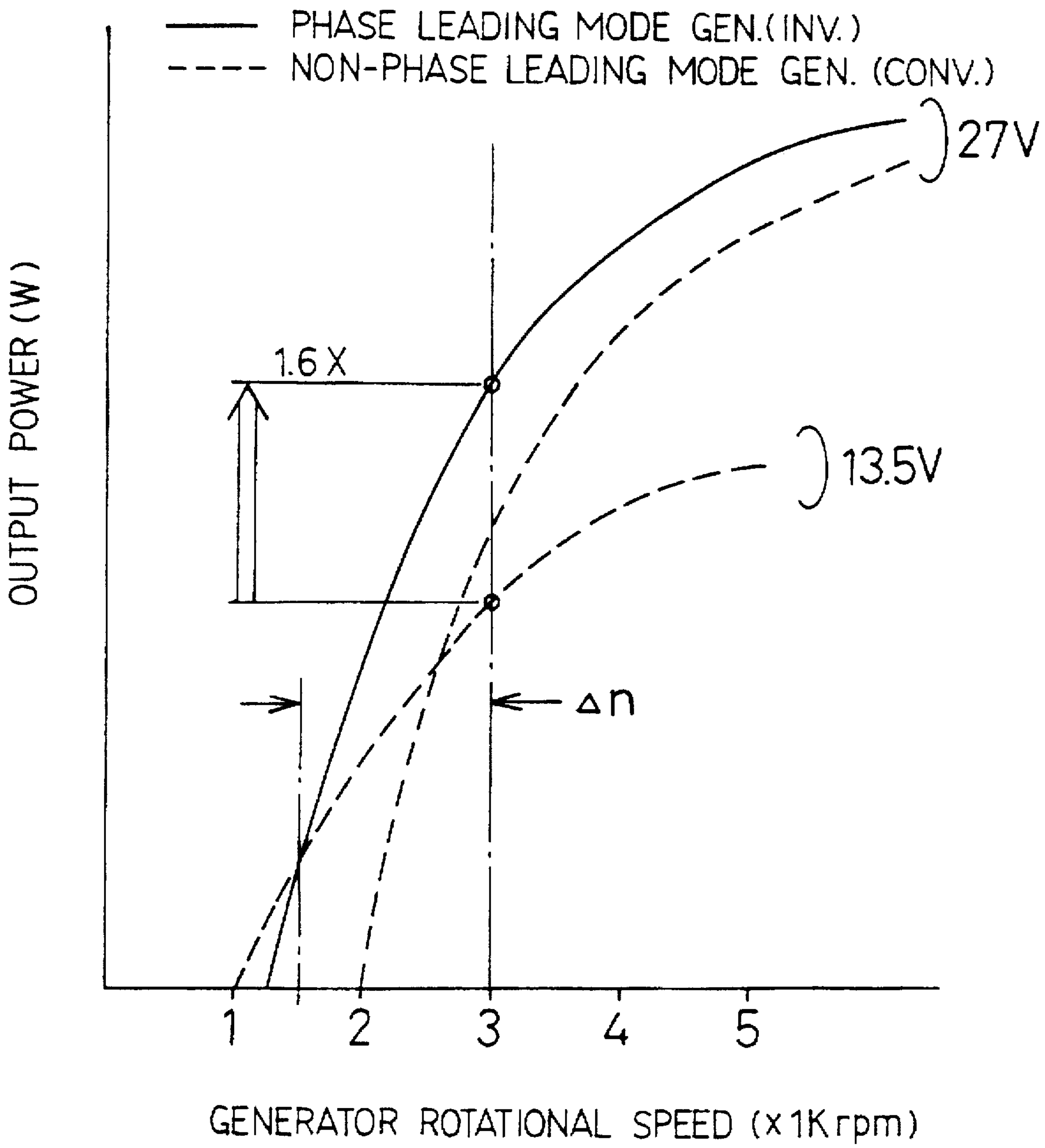
FIG. 15 is a graph showing the relationship between the rotational speed of a power generator and the output power obtained in the fifth embodiment by switching between power-generating voltages.

FIG. 15 illustrates the result of experiments performed using the present embodiment. A vehicle alternator having a voltage rating of 13.5 V and a rated maximum output current of about 100A was used as the power generator. From high-voltage generation using the leading phase control mode, output power could be increased about 60% over conventional power generation (of 13.5 V) at 3000 rpm.

It can be further understood from the result of experiments shown in FIG. 15 that when the low-voltage generation mode (13.5V) is executed in the conventional non-leading phase control mode and the high-voltage generation mode (27 V) is executed in the leading phase control mode, the latter can provide a higher output at about 1500 rpm or more.

Figure 16:
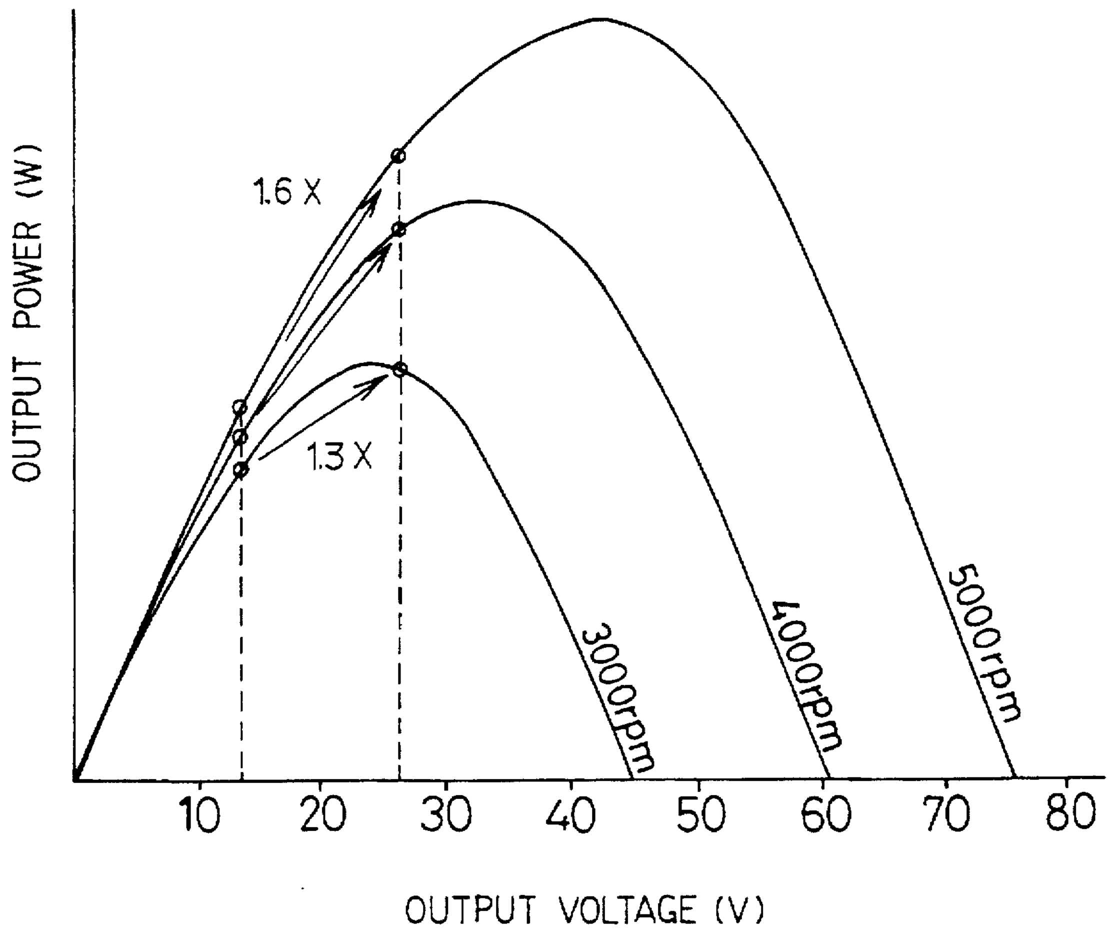
FIG. 16 is a graph illustrating the relationship between the output voltage of the power generator, the output power and the number of revolutions obtained in the fifth embodiment.

In the present embodiment, when the same machine is driven at each of 3000 rpm, 4000 rpm and 5000 rpm in the non-leading phase control mode, a characteristic chart illustrating variations in output power at the time that the output voltage Vo has been varied in various ways, is obtained as shown in FIG. 16.

In the aforementioned embodiment, the leading phase control mode has been executed based on the voltage drop developed across the small resistance for current detection, which has been incorporated in each of the MOSFETs 11*a* through 11*f*. Of course, the leading phase control mode may be executed based on other input parameters such as the position of each magnetic pole, the voltage drop developed across each of the MOSFETs 17*a* through 17*f*, etc.

Sixth Embodiment

In the present embodiment, an EHC (Electric Heating Catalyst) used only for a predetermined time interval, e.g., 60 seconds immediately after start-up of the engine, is used as the high-voltage load 10 *a* employed in the first embodiment.

Figure 17:
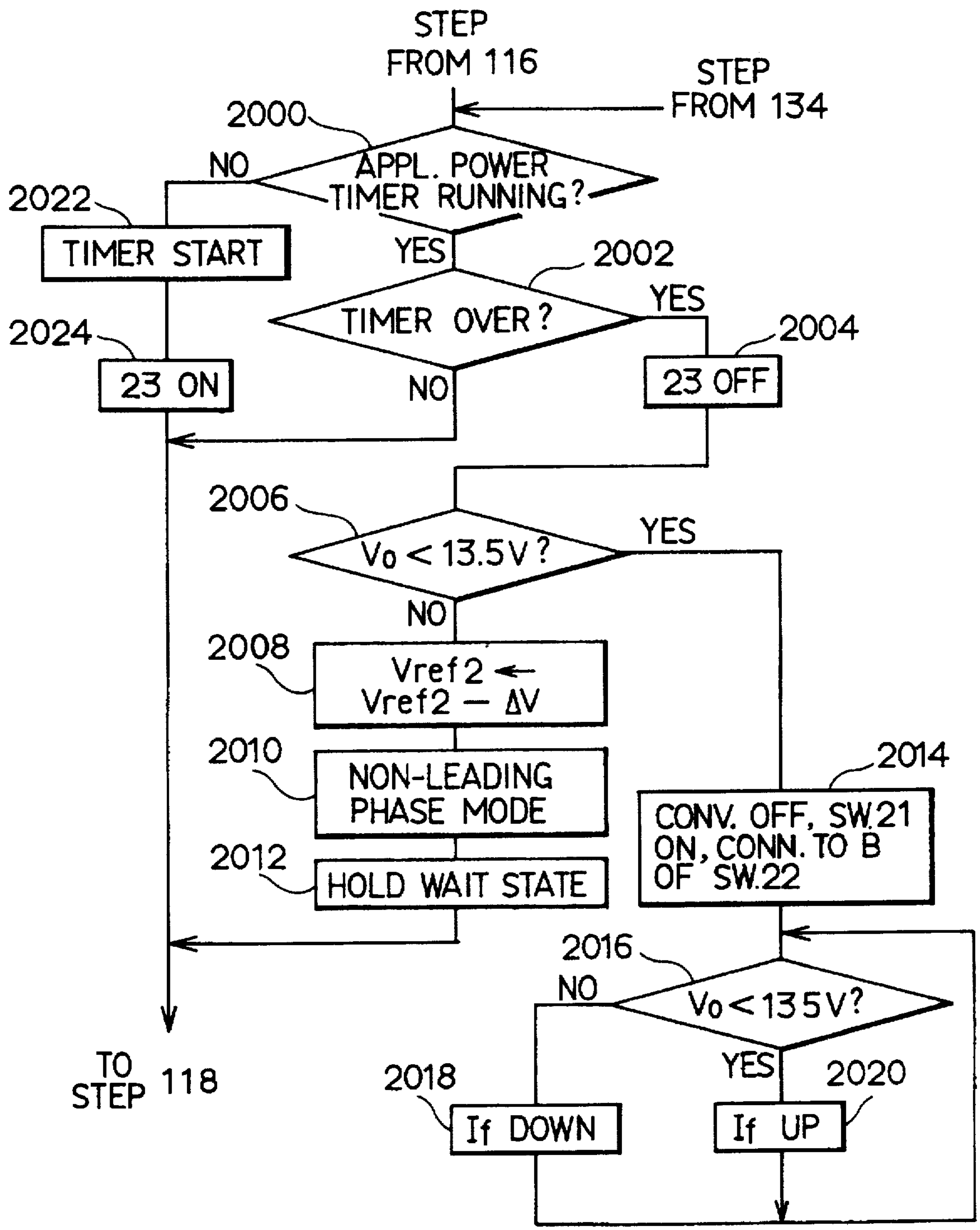
FIG. 17 is a flowchart describing a sixth embodiment of a vehicle power generating system according to the present invention.

The present embodiment will be described with reference to a flowchart shown in FIG. 17. The flowchart shown in FIG. 17 is inserted immediately before Step 118 of FIG. 14.

Firstly, execution proceeds from Step 116 or Step 134 to Step 2000 where the controller 7 checks whether a timer for deciding a period in which power is applied to the high-voltage load 10 *a* is running. If the answer is found to be NO at Step 2000, then the timer is started (Step 2022) and the switch 23 used for applying power to the high-voltage load 10 *a* is turned on and execution proceeds to Step 118.

If the answer is found to be YES at Step 2000, the controller 7 then checks whether the counting of the timer set to 60 seconds in advance has been finished, i.e., 60 seconds has elapsed since the commencement of counting of the timer (Step 2002). If the answer is found to be NO at Step 2002, then execution proceeds to Step 118. If the answer is found to be YES at Step 2002, then the switch 23 is turned off (Step 2004) and a check is made as to whether the output voltage Vo has been reduced to 13.5 V corresponding to the first adjusted voltage Vref1 (Step 2006). If the answer is found to be NO at Step 2006, then the second adjusted voltage Vref2 is decreased by a predetermined small value and the control mode is set to the non-leading phase control mode (Step 2010). Thereafter, a standby state is held for a predetermined time interval (Step 2012) and execution proceeds to Step 118. Since the second adjusted voltage Vref2 is reduced at Step 2008, the routine passes through Steps 118, 130 and 134 and moves to Step 2000.

If the output voltage Vo is reduced and becomes less than 13.5 V at Step 2006 owing to the above traveling, then the DC-DC converter 2 is turned off, the short-circuit switch 21 is turned off and the change-over switch 22 is connected to the battery side (Step 2014).

Next, the low-voltage generation mode is selected and a check is made as to whether the output voltage Vo is smaller than the first adjusted voltage Vref1=13.5 V (Step 2016). If the answer is found to be YES at Step 2016, then the conductivity of the switching transistor (not shown) for control of the field current is increased by a predetermined small value. If the answer is found to be NO at 2016, then the conductivity of the switching transistor is reduced by the predetermined small value and thereafter execution returns to Step 2016. In this way, the high-voltage load 10 *a* can be intermitted smoothly.

Incidentally, each of the MOSFETs 17*a* through 17*f*, MOSFETs 11*a* through 11*f* and MOSFETs 41 through 43 can be formed of SiC corresponding to a compound monocrystal semiconductor composed of silicon Si and carbon C. Each of the SiC-MOSFETs has an advantage that it has a low loss (Si ratio: ¼), a high withstand voltage (Si ratio: five times) and high heat resistance (it can be used with a cooling fin temperature of 50° C. or more) as compared with an Si-MOSFET. Accordingly, a small-sized and simple power generating system can be provided wherein owing to this modification, a cooling fin can be reduced in size and an additive circuit or additive control such as the absorption of surges, etc. can be made unnecessary.

In the aforementioned embodiments, the rotor for producing field magnetic flux may be one including a permanent magneto alone exclusive of the field coil.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A power generating system comprising:

storage means for storing electrical energy therein;

a synchronous power generator having a rotor for producing field magnetic flux and a stator with armature windings disposed thereon to produce a power-generating voltage;

AC-DC power converting means for rectifying a power-generating voltage outputted from said armature windings as generated power and supplying at least a first portion of said generated power to said storage means; and control means for adjusting said power-generating voltage produced by said synchronous power generator to a first voltage for charging said storage means and a predetermined second voltage different from said first voltage;

wherein said control means is connected to said AC-DC power converting means and is further for receiving at least a second portion of said generated power from said AC-DC power converting means and for supplying said at least a second portion of said generated power as a leading phase current preceding in phase a phase voltage to said each armature winding when said control means adjusts said power-generating voltage to at least said second voltage.

2. A power generating system according to claim 1, wherein:

said rotor has a field winding; and said control means is further for adjusting an amount of field current supplied to said field winding and said leading phase current to control said power-generating voltage.

3. A power generating system according to claim 1, wherein said second voltage is set higher than said first voltage.

4. A power generating system according to claim 3, wherein said second voltage is set to be in a range of 1.2 to 5 times said first voltage.

5. A power generating system according to claim 3, further comprising step-down means for reducing said power-generating voltage corresponding to said second voltage to said first voltage to charge said storage means.

6. A power generating system according to claim 5, wherein said step-down means comprises a DC-DC converter.

7. A power generating system according to claim 3, further comprising:

a high-voltage load to be driven by said second voltage;

switching means disposed between said synchronous power generator and said high-voltage load to selectively make and break an electrical connection therebetween;

wherein said synchronous power generator is connected to said high-voltage load through said switching means; and said control means is further for adjusting said power-generating voltage to said second voltage when said switch means is turned on.

8. A power generating system according to claim 7, wherein said high-voltage load includes a catalytic heater.

9. A power generating system according to claim 3, wherein said control means is further for supplying an initial field current from said storage means to said field winding and for switching a high-potential terminal of said field winding from said storage means to an output terminal of said power generator after said power-generating voltage has been established.

10. A power generating system according to claim 3, wherein said control means is further for reducing said field current when said power-generating voltage exceeds said second voltage.

11. A power generating system according to claim 3, further comprising:

number-of-revolutions detecting means for detecting a number of revolutions of said power generator;

wherein when said number of revolutions is high, said control means is further for controlling said power-generating voltage to a voltage higher than a voltage at a time that said number of revolutions is low.

12. A power generating system according to claim 1, wherein said control means comprises:

an inverter including a plurality of high side switches each composed of a semiconductor switching device for connecting a high-potential DC power terminal to an output terminal of said armature windings, and a plurality of low side switches each composed of a semiconductor switching device for connecting a low-potential DC power terminal to said output terminal of said armature windings; and a controller for controlling said semiconductor switching devices forming said high side switches and said semiconductor switching devices forming said low side switches;

said controller supplying said leading phase current to a corresponding one of said armature windings due to a delay in off timing of said semiconductor switching devices.

13. A power generating system according to claim 12, wherein said semiconductor switching devices include bidirectional conducting element.

14. A power generating system according to claim 13, wherein said semiconductor switching devices include MOSFETs.

15. A power generating system according to claim 14, wherein said MOSFETs are SiC MOSFETs.

16. A power generating system according to claim 12, further comprising:

current detection resistances each connected in series with a corresponding one of said semiconductor switching devices;

wherein said control means is further for controlling said leading phase current based on a voltage drop developed across each of said current detection resistances.

17. A power generating system according to claim 16, wherein each of said current detection resistances is formed integrally with said corresponding one of said semiconductor switching devices.

18. A power generating system according to claim 1, wherein said control means includes:

a short-circuiting circuit, composed of semiconductor switching devices, for short-circuiting output terminals of said armature windings; and a controller for controlling said semiconductor switching devices;

wherein said controller is further for allowing a leading phase current to flow in said armature windings after a current flowing out from said armature windings has been brought to zero, and is further for allowing said leading phase current to flow out from said armature windings after said current flowing into said armature windings has been brought to zero.

19. A power generating system according to claim 1, further including:

magnetic pole position detecting means for detecting a position of magnetic poles of said rotor;

wherein said current control means is further for determining a carrying period of said leading phase current based on said detected position of magnetic poles.

20. A method of controlling a power generating system including a storage device storing electrical energy therein, a synchronous power generator having a rotor producing field magnetic flux and a stator with armature windings disposed thereon to produce a power-generating voltage, an AC-DC power converter rectifying a power-generating voltage outputted from said armature windings as generated power and supplying at least a first portion of said generated power to said storage device, and a controller connected to said AC-DC power converter adjusting said power-generating voltage produced by said synchronous power generator to a first voltage to charge said storage device and a predetermined second voltage different from said first voltage, said method comprising the steps of:

receiving at least a second portion of said generated power from said AC-DC power converter at said controller;

supplying said at least a second portion of said generated power as a leading phase current preceding in phase a phase voltage to said armature windings when said power-generating voltage is adjusted to at least said second voltage; and producing field magnetic flux using said armature windings in addition to said rotor.

* * * * *